US012189318B2

(12) United States Patent
Takagi

(10) Patent No.: US 12,189,318 B2
(45) Date of Patent: Jan. 7, 2025

(54) TRANSFER DEVICE AND IMAGE FORMING APPARATUS

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/220,844

(22) Filed: Jul. 12, 2023

(65) Prior Publication Data

US 2024/0019803 A1 Jan. 18, 2024

(30) Foreign Application Priority Data

Jul. 15, 2022 (JP) ................................ 2022-114093

(51) Int. Cl.

*G03G 15/16* (2006.01)
*G03G 15/00* (2006.01)
*G03G 15/20* (2006.01)

(52) U.S. Cl.

CPC ..... *G03G 15/5008* (2013.01); *G03G 15/1615* (2013.01); *G03G 15/162* (2013.01); *G03G 15/2064* (2013.01); *G03G 15/758* (2013.01); *G03G 2215/0617* (2013.01)

(58) Field of Classification Search

CPC ........... G03G 15/1615; G03G 15/1605; G03G 2215/0129; G03G 15/161; G03G 21/1647; G03G 15/2028

See application file for complete search history.

(56) References Cited

U.S. PATENT DOCUMENTS

| | | | |
|---|---|---|---|
| 9,367,018 B1 | 6/2016 | Yanagawa et al. | |
| 2003/0091366 A1 | 5/2003 | Saito et al. | |
| 2003/0161656 A1 | 8/2003 | Miura et al. | |
| 2006/0072929 A1 | 4/2006 | Takahashi | |
| 2012/0190489 A1 | 7/2012 | Takagi | |
| 2013/0322909 A1* | 12/2013 | Shiga | G03G 21/16 399/121 |
| 2015/0240879 A1 | 8/2015 | Takagi et al. | |
| 2016/0062300 A1 | 3/2016 | Takagi et al. | |
| 2016/0103404 A1* | 4/2016 | Hasegawa | G03G 15/0136 399/313 |
| 2017/0010576 A1 | 1/2017 | Takagi et al. | |
| 2018/0074455 A1 | 3/2018 | Takagi | |

(Continued)

FOREIGN PATENT DOCUMENTS

| | | |
|---|---|---|
| JP | 2003-208073 | 7/2003 |
| JP | 2003-287992 | 10/2003 |

(Continued)

*Primary Examiner* — Jessica L Eley
(74) *Attorney, Agent, or Firm* — XSENSUS LLP

(57) ABSTRACT

A transfer device includes a movable component, a moving assembly, a restrictor, and an operating member. The movable component moves toward and away from a latent image bearer unit. The moving assembly causes the movable component to move toward and away from the latent image bearer unit. The restrictor restricts the latent image bearer unit from detaching from an image forming apparatus. The operating member causes the moving assembly to move the movable component away from the latent image bearer unit and releases restriction of detachment of the latent image bearer unit from the image forming apparatus by the restrictor.

8 Claims, 15 Drawing Sheets

(56) References Cited

U.S. PATENT DOCUMENTS

| | | | | |
|---|---|---|---|---|
| 2019/0018348 | A1* | 1/2019 | Watanabe .......... | G03G 15/2092 |
| 2019/0286017 | A1 | 9/2019 | Nakamoto et al. | |
| 2020/0004181 | A1* | 1/2020 | Okada ................ | G03G 15/2032 |
| 2023/0042229 | A1 | 2/2023 | Nakamura et al. | |

FOREIGN PATENT DOCUMENTS

| | | |
|---|---|---|
| JP | 2006-133733 | 5/2006 |
| JP | 2009-109584 | 5/2009 |
| JP | 2009-122391 | 6/2009 |
| JP | 2018-013503 | 1/2018 |

* cited by examiner

TRANSFER DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-114093, filed on Jul. 15, 2022, in the Japan Patent Office, the entire disclosure of which is hereby incorporated by reference herein.

BACKGROUND

Technical Field

Embodiments of the present disclosure relate to a transfer device and an image forming apparatus including the transfer device.

Related Art

An image forming apparatus is known that includes a latent image bearer unit including, for example, photoconductors, detachable from the image forming apparatus.

The latent image bearer unit and the transfer device that includes, for example, an intermediate transfer belt are disposed close to each other in the image forming apparatus. For this reason, an image forming apparatus is known that includes a mechanism for causing a component disposed in a transfer device to move toward and away from a latent image bearer unit to prevent the component from interfering with the latent image bearer unit when the latent image bearer unit is attached to and detached from the image forming apparatus.

In such an image forming apparatus, a lock-release operating part is operated to move an intermediate transfer belt in a direction away from a secondary transfer roller and photoconductors. Pressing down the lock-release operating part allows a second operating part for pulling out an image forming device to come out. When the image forming device is pulled out halfway by the second operating part, a third operating part comes out. The image forming apparatus also includes a fall-off prevention pawl to prevent pulling out of the image forming device halfway. The third operating part includes a release mechanism to release the restriction of the fall-off prevention pawl.

SUMMARY

In an embodiment of the present disclosure, a transfer device includes a movable component, a moving assembly, a restrictor, and an operating member. The movable component moves toward and away from a latent image bearer unit. The moving assembly causes the movable component to move toward and away from the latent image bearer unit. The restrictor restricts the latent image bearer unit from detaching from an image forming apparatus. The operating member causes the moving assembly to move the movable component away from the latent image bearer unit and releases restriction of detachment of the latent image bearer unit from the image forming apparatus by the restrictor.

In another embodiment of the present disclosure, an image forming apparatus includes the transfer device and the latent image bearer unit including a latent image bearer.

In still another embodiment of the present disclosure, an image forming apparatus includes a body, a latent image bearer unit, a movable component, a moving assembly, a restrictor, and an operating member. The latent image bearer unit is attachable to and detachable from the body. The movable component moves toward and away from the latent image bearer unit. The moving assembly moves the movable component toward and away from the latent image bearer unit. The restrictor restricts the latent image bearer unit from detaching from the body. The operating member causes the moving assembly to move the movable component toward and away from the latent image bearer unit and releases restriction of detachment of the latent image bearer unit from the image forming apparatus by the restrictor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 19A is a diagram illustrating a configuration of the transfer device in which primary transfer rollers are arranged at respective contact positions; and FIG. 19B is a diagram illustrating a configuration of the transfer device in which a primary transfer roller of a most-downstream primary transfer section is arranged at a separation position;

Figure 1:
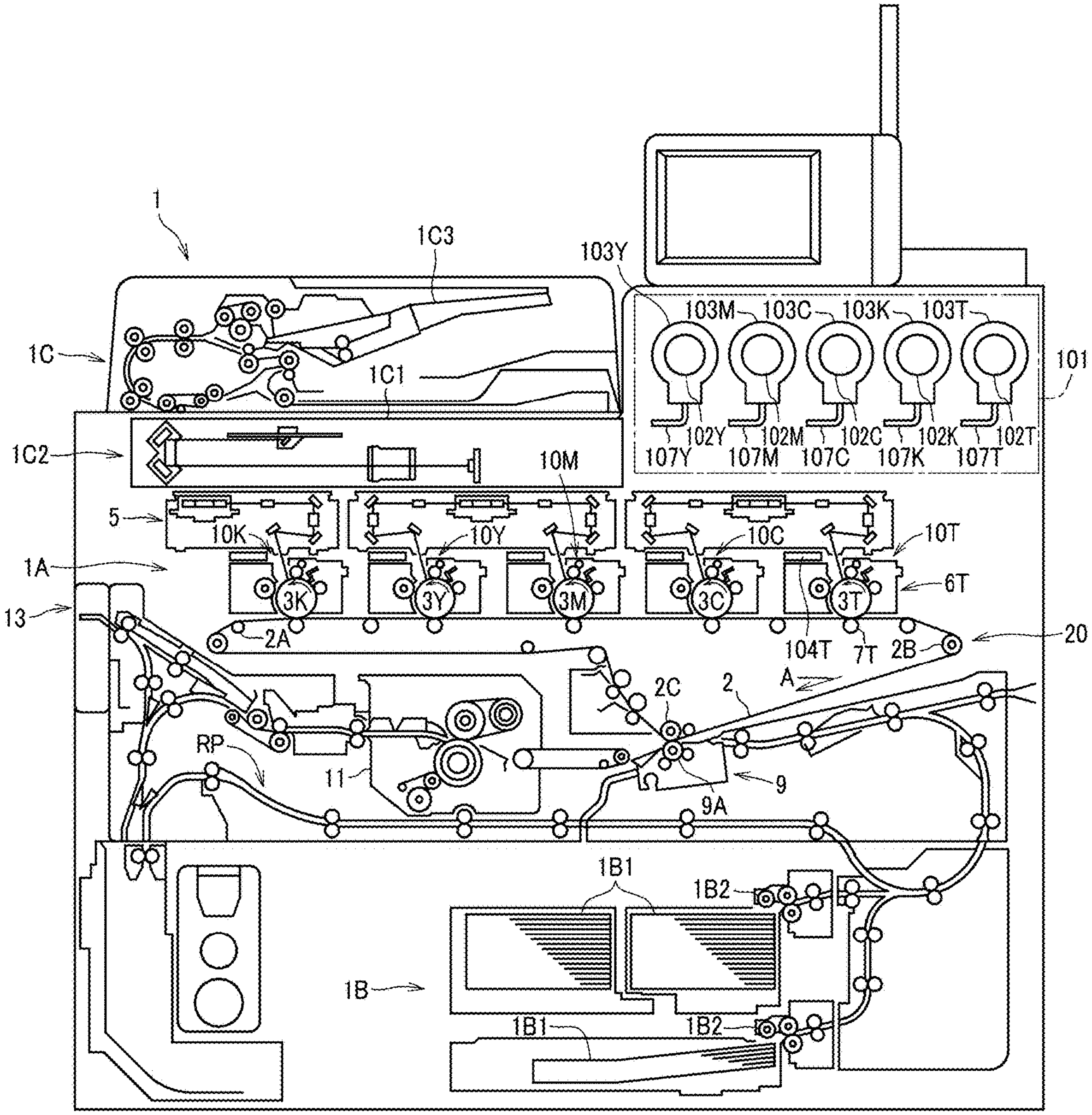
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings in the following description. In the drawings, like reference signs denote like or equivalent components and overlapping description of those components may be simplified or omitted as appropriate.

FIG. 1 is a schematic diagram illustrating a configuration of an image forming apparatus 1 according to an embodiment of the present disclosure. The image forming apparatus 1 illustrated in FIG. 1 is a tandem-type color printer in which multiple photoconductors as latent image bearers are arranged in parallel. Each of the photoconductors provided for the image forming apparatus 1 can form a toner image in a color corresponding to a color separation component of a color image using toner as developer supplied from a developing device. After the toner images formed on the photoconductors are superimposed and transferred to an intermediate transferor, the superimposed images are collectively transferred to a sheet as a recording medium. By so doing, a multicolor image can be formed on the sheet. An image forming apparatus according to an embodiment of the present disclosure is not limited to a color printer but may be, for example, a color copier, a facsimile apparatus, or a printing machine.

As illustrated in FIG. 1, the image forming apparatus 1 includes an image former 1A in a center portion of the image forming apparatus 1 in the vertical direction, a sheet feeder 1B below the image former 1A, and a document scanner 1C including a document loading table 1C1 above the image former 1A. The image former 1A includes an intermediate transfer belt 2 as an intermediate transferor or as a belt. The intermediate transfer belt 2 has a stretched surface in a horizontal direction. The image forming apparatus 1 includes components that form images in colors complementary to color separation colors above the intermediate transfer belt 2.

The image former 1A includes multiple photo conductor development units (PCDU) 10K, 10C, 10M, and WY as latent image bearer units. The PCDUs 10K, 10C, 10M, and 10Y can form images with toners of colors of yellow, magenta, cyan, and black, respectively, in a complementary color relation. The PCDU 10T forms a glossy image with transparent toner. In the PCDUs 10K, 10C, 10M, 10Y, and 10T, photoconductors 3K, 3C, 3M, 3Y, and 3T, respectively, that can bear images are arranged in parallel along the stretched surface of the intermediate transfer belt 2. The photoconductor 3T bears an image of a transparent toner. In the following description, each of the photoconductors 3K, 3C, 3M, 3Y, and 3T may be referred to simply as a photoconductor 3 in a case in which a similar description applies to all the photoconductors 3K, 3C, 3M, 3Y, and 3T. In addition, the PCDUs 10K, 10C, 10M, 10Y, and 10T may also be referred to simply as a PCDU 10 in a case in which a similar description applies to all the PCDUs 10K, 10C, 10M, 10Y, and 10T. The PCDUs 10K, 10C, 10M, 10Y, and 10T include at least the photoconductors 3K, 3C, 3M, 3Y, and 3T, respectively. In the present embodiment, each of the PCDUs 10K, 10C, 10M, 10Y, and 10T includes, for example, a developing device.

Each of the multiple photoconductors 3K, 3C, 3M, 3Y, and 3T is made of a drum rotatable in the same direction, which is a counterclockwise direction in FIG. 1. Around each of the photoconductors 3K, 3C, 3M, 3Y, and 3T, a charger, a writing device, a developing device 6, a primary transfer roller as a primary transferor, and a cleaner are arranged. The photoconductor 3, the charger, the writing device, the developing device 6, the primary transfer roller 7, and the cleaner collectively perform image forming processing when the photoconductor 3 rotates. For the sake of convenience, a developing device 6T and a primary transfer roller 7T provided for the photoconductor 3T are illustrated with the reference numeral and the suffix T in FIG. 1.

A transfer device 20 includes the intermediate transfer belt 2, the primary transfer rollers 7K, 7Y, 7M, 7C, and 7T as primary transferors, multiple rollers 2A and 2B, and a secondary-transfer backup roller 2C. The primary transfer roller 7T is illustrated with the reference sign in FIG. 1 for the sake of convenience.

Toner images formed in the PCDUs 10K, 10C, 10M, 10Y, and 10T including the photoconductors 3K, 3C, 3M, 3Y, and 3T, respectively, are sequentially transferred to the intermediate transfer belt 2. The intermediate transfer belt 2 is stretched around the rollers 2A and 2B, the secondary-transfer backup roller 2C, and multiple rollers that are not denoted with reference numerals in FIG. 1, to rotate in a direction indicated by arrow A in FIG. 1. The intermediate transfer belt 2 faces the photoconductors 3K, 3C, 3M, 3Y, and 3T at multiple positions. The rollers 2A and 2B stretch the intermediate transfer belt 2 at two positions outer than the multiple positions in the direction of rotation of the intermediate transfer belt 2. The secondary-transfer backup roller 2C faces the secondary transfer device 9 with the intermediate transfer belt 2 interposed between the secondary-transfer backup roller 2C and the secondary transfer device 9.

The secondary transfer device 9 includes a secondary transfer roller 9A. The secondary transfer roller 9A forms a secondary transfer nip at a position at which the secondary transfer roller 9A presses against the secondary-transfer backup roller 2C with the intermediate transfer belt 2 interposed between the secondary transfer roller 9A and the secondary-transfer backup roller 2C. A secondary transfer bias having the same polarity as the polarity of toner is applied to the secondary-transfer backup roller 2C. On the other hand, the secondary transfer roller 9A is grounded. Accordingly, a secondary transfer electric field is formed at the secondary transfer nip to electrostatically move a multicolor toner image on the intermediate transfer belt 2 from the intermediate transfer belt 2 toward the secondary transfer roller 9A. The multicolor toner image is transferred onto a sheet, which is conveyed to the secondary transfer nip, at the secondary transfer nip.

A sheet as a recording medium is fed to the secondary transfer nip from the sheet feeder 1B. The sheet feeder 1B includes multiple sheet feed trays 1B1 and multiple conveyance rollers 1B2. The multiple conveyance rollers 1B2 are disposed on a conveyance path of the sheet fed from the sheet feed trays 1B1.

The photoconductors 3K, 3C, 3M, 3Y, and 3T are irradiated with writing light by the writing devices 5, and electrostatic latent images corresponding to image data are formed on the photoconductors 3K, 3C, 3M, 3Y, and 3T. The image data is obtained by scanning a document on the document loading table 1C1 disposed in the document scanner 1C, or by image data output from a computer.

The document scanner 1C includes a scanner 1C2 and an automatic document feeder 1C3. The scanner 1C2 exposes and scans a document on the document loading table 1C1. The automatic document feeder 1C3 is disposed above an upper surface of the document loading table 1C1. The automatic document feeder 1C3 can invert a document fed onto the document loading table 1C1 to scan front and back sides of the document.

Each of the electrostatic latent images on the photoconductors 3K, 3C, 3M, 3Y, and 3T formed by the writing devices 5 is subjected to visual image processing by the corresponding one of the developing devices 6K, 6C, 6M, 6Y, and 6T and primarily transferred to the intermediate transfer belt 2. The developing device 6T is illustrated with the reference sign in FIG. 1 for the sake of convenience. After toner images of black, yellow, cyan, magenta, and transparent colors are superimposed and transferred onto the intermediate transfer belt 2, the toner images are secondarily transferred onto a sheet collectively by the secondary transfer device 9.

Subsequently, a multicolor image to be fixed borne on the surface of the sheet on which the secondary transfer has been performed is fixed by the fixing device 11. The fixing device 11 has a belt fixing structure that includes a fixing belt heated by a heating roller and a pressure roller facing and in contact with the fixing belt. In such a configuration, a contact area, in other words, a nip area is disposed between the fixing belt and the pressure roller, thus allowing an area in which the sheet is heated to be increased as compared with a heat-roller fixing structure.

A conveyance direction of the sheet that has passed through the fixing device 11 can be switched by a conveyance-path switching claw disposed in a rear portion of the fixing device 11. Specifically, the conveyance direction of the sheet is selected between the conveyance path directed to a sheet ejector 13 and a reverse conveyance path RP by the conveyance-path switching claw.

In the image forming apparatus 1 having the above-described configuration, electrostatic latent images are formed on the uniformly charged photoconductors 3K, 3C, 3M, 3Y, and 3T by exposure scanning of a document placed on the document loading table 1C1 or by reading image data from a computer. Subsequently, the electrostatic latent images are subjected to visual image processing by the developing devices 6K, 6C, 6M, 6Y, and 6T. Then, the toner images are primarily transferred to the intermediate transfer belt 2. The image former 1A that forms an image includes, for example, the above-described PCDUs 10K, 10C, 10M, 10Y, and 10T, the writing devices 5, the transfer device 20, the secondary transfer device 9, and the fixing device 11.

In the case of a single-color image, a toner image that has been transferred to the intermediate transfer belt 2 is transferred onto a sheet fed from the sheet feeder 1B as is. In the case of a multicolor image, primary transfer is repeated such that toner images are superimposed one on another. Then, the toner images are secondarily transferred to the sheet collectively. The unfixed image that has been secondarily transferred onto the sheet is fixed by the fixing device 11. Then, the sheet is fed to the sheet ejector 13 or reversed and fed again to the secondary transfer nip.

In FIG. 1, the intermediate transfer belt 2 is formed of, for example, a single layer or multiple layers of polyvinylidene fluoride (PVDF), ethylene-tetrafluoroethylene copolymer (ETFE), polyimide (PI), or polycarbonate (PC). A conductive material such as carbon black is dispersed in the intermediate transfer belt 2. The intermediate transfer belt 2 is adjusted to have a volume resistivity in a range of $10^8$ to $10^{12}$ Ωcm and a surface resistivity in a range of $10^9$ to $10^{13}$ Ωcm. The surface of the intermediate transfer belt 2 may be coated with a release layer as needed. Examples of the material employed for coating the intermediate transfer belt 2 include fluororesins such as ethylene-tetrafluoroethylene copolymer (ETFE), polytetrafluoroethylene (PTFE), polyvinylidene fluoride (PVDF), perfluoroalkoxy fluororesin (PFA), tetrafluoroethylene-hexafluoropropylene copolymer (FEP), and vinyl fluoride (PVF). However, the materials employed for coating the intermediate transfer belt 2 are not limited to the above-described fluororesins. Examples of a method for producing the intermediate transfer belt 2 include a casting method and a centrifugal molding method. The surface of the intermediate transfer belt 2 may be polished as needed. When the volume resistivity of the intermediate transfer belt 2 exceeds the above-described range, a bias needed to transfer a toner image onto a sheet increases. Accordingly, the cost of power source for the intermediate transfer belt 2 is increased. For this reason, such a configuration of the intermediate transfer belt 2 is not preferable. Further, charging potential of the intermediate transfer belt 2 increases in, for example, a transfer process or a transfer-sheet peeling process. Accordingly, self-discharge of the intermediate transfer belt 2 may be difficult. For this reason, an electric-charge remover is needed. In addition, when the volume resistivity and the surface resistivity of the intermediate transfer belt 2 are lower than the above-described ranges, attenuation of the charging potential is fast, which is advantageous for removing electric charges of the intermediate transfer belt 2 due to self-discharge. However, an electric current at the time of transfer flows in a plane direction of the surface of the intermediate transfer belt 2. Accordingly, toner scattering may occur. For this reason, the volume resistivity and the surface resistivity of the intermediate transfer belt 2 according to the present embodiment are preferably set within the ranges described above. For the measurement of the volume resistivity and the surface resistivity of the intermediate transfer belt 2, a high-resistance resistivity meter (Hiresta-IP, registered trademark, manufactured by Mitsubishi Chemical Corporation) was connected to a high resistance state (HRS) probe having the inner electrode diameter of 5.9 mm and the ring-electrode inner-diameter of 11 mm. A voltage of 100 V with the surface resistivity of 500 V was applied to the front and back surfaces of the intermediate transfer belt 2 and a measured value after 10 seconds from a time at which the voltage of 100 V and the surface resistivity of 500 V was applied, was employed.

The intermediate transfer belt 2 is stretched around at least the roller 2A and the roller 2B as a roller pair and the secondary-transfer backup roller 2C disposed at the secondary transfer nip. The roller 2A as a driving roller is set to rotate clockwise such that the intermediate transfer belt 2 moves in the direction indicated by arrow A illustrated inside the intermediate transfer belt 2 in FIG. 1. The surface of the intermediate transfer belt 2, on which the toner images are transferred, moving between the roller 2A and the roller 2B faces the photoconductors 3K, 3Y, 3C, 3M, and 3T of the PCDUs 10K, 10C, 10M, 10Y, and 10T. The primary transfer rollers 7K, 7Y, 7M, 7C, and 7T serve as primary transferors for electrostatically transferring visible images on the respective photoconductors 3 to the intermediate transfer belt 2. The primary transfer rollers 7K, 7Y, 7M, 7C, and 7T are disposed at positions at which the primary transfer rollers 7K, 7Y, 7M, 7C, and 7T face the photoconductors 3K, 3C, 3M, 3Y, and 3T, respectively, via the intermediate transfer belt 2. The primary transfer roller 7T is illustrated with the reference sign in FIG. 1 for the sake of convenience.

The primary transfer rollers 7K, 7Y, 7M, 7C, and 7T according to the present embodiment are cored bars made of metal such as iron, steel use stainless (SUS), or aluminum (Al) coated with foam resin. The foam resin has a wall thickness of 2 mm to 10 mm. Known blade-shaped or brush-shaped transferors may also be employed as the transferors.

In the present embodiment, white toner is employed for the purpose of forming a white base color for an image in addition to toner employed for full-color image formation. In addition, transparent toner may be employed for the purpose of enhancing glossiness and transferability of an image, and, for example, light cyan toner or light magenta toner may be selected for increasing a color gamut. For the purpose of creating a colored metal color such as a red copper color and a bronze color, toner of a metal color such as gold toner and silver toner may also be employed as a base.

Figure 2:
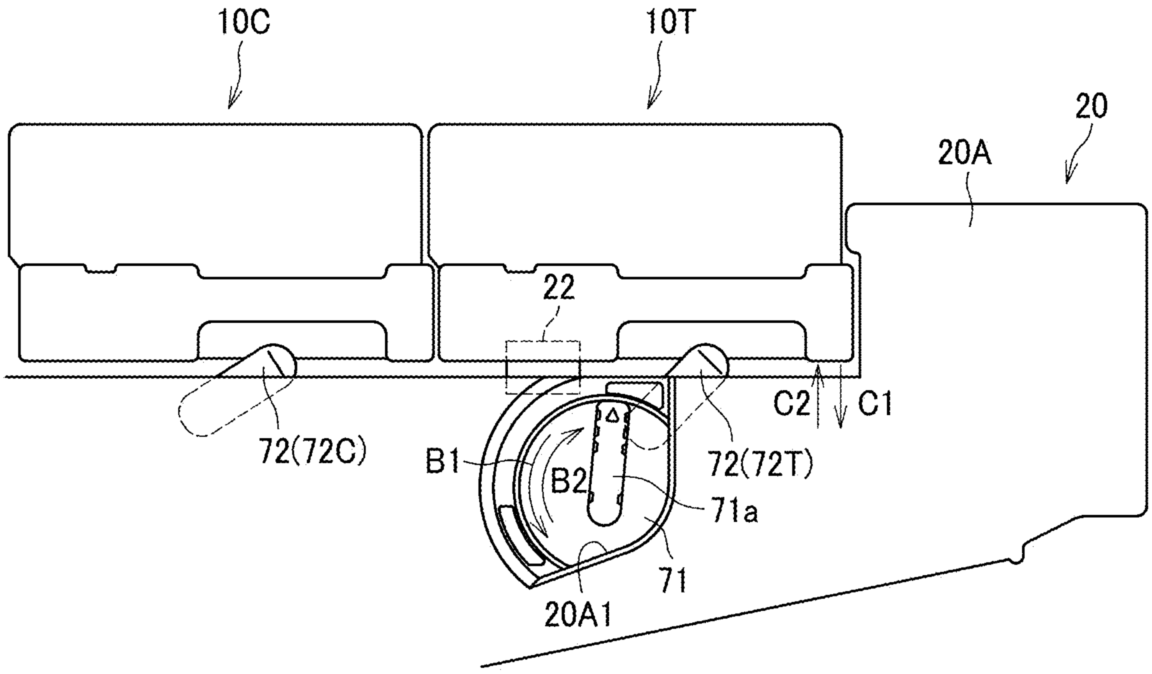
FIG. 2 is a front view of a configuration around a release lever arranged at a restriction position, according to an embodiment of the present disclosure.

As illustrated in FIGS. 1 and 2, the PCDUs 10K, 10C, 10M, 10Y, and 10T are disposed above the transfer device 20. Moving the PCDUs 10K, 10C, 10M, 10Y, and 10T in a direction perpendicular to the plane on which FIG. 2 is drawn allows the PCDUs 10K, 10C, 10M, 10Y, and 10T to be attached to and detached from the body of the image forming apparatus 1.

A sensor 22 disposed in the transfer device 20 is arranged at a position at which the sensor 22 interferes with the PCDU 10T when the PCDU 10T is detached. For this reason, when the PCDU 10T is attached to and detached from the body of the image forming apparatus 1, the sensor 22 is separated from the PCDU 10T. As described above, the sensor 22 is disposed in the transfer device 20 and is a movable component that moves in directions toward and away from the PCDU 10T. The direction in which the sensor 22 separates from the PCDU 10T is a direction indicated by arrow C1 of FIG. 2, and a direction in which the sensor 22 approaches the PCDU 10T is a direction indicated by arrow C2 of FIG. 2.

The transfer device 20 includes restrictors 72C and 72T. In the following description, the restrictors 72C and 72T may be referred to simply as restrictor 72 in a case in which a similar description applies to the restrictors 72C and 72T. In FIG. 2, the restrictors 72C and 72T are arranged at positions at which the restrictors 72C and 72T interfere with the PCDUs 10C and 10T, respectively, when the PCDUs 10C and 10T are detached. In other words, the restrictors 72C and 72T are arranged at positions overlapping with the PCDUs 10C and 10T, respectively, on the plane on which FIG. 2 is drawn, which is a plane perpendicular to a direction in which the PCDUs 10C and 10T are detached. The restrictors 72C and 72T, respectively, interfere with the PCDUs 10C and 10T to restrict the PCDUs 10C and 10T from moving in a direction toward the front side in the direction perpendicular to the plane on which FIG. 2 is drawn, which is the direction in which the PCDUs 10C and 10T are detached from the body of the image forming apparatus 1.

An inner cover 20A that is a portion of a transfer frame includes a release lever 71. The release lever 71 is an operating member for moving the sensor 22 in directions toward and away from the PCDU 10T and switching whether the restrictor 72T restricts the PCDU 10T.

Figure 3:
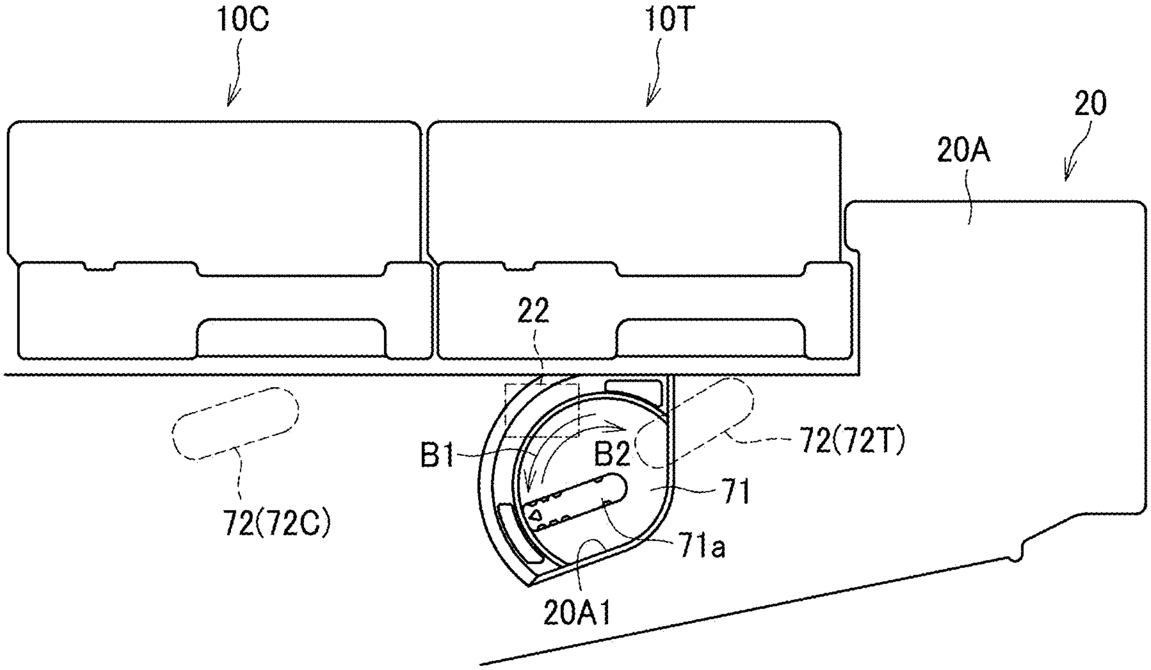
FIG. 3 is a front view of the configuration around the release lever of FIG. 2 arranged at a release position, according to an embodiment of the present disclosure.

The release lever 71 includes a lever portion 71*a* as an operating portion. The lever portion 71*a* is rotatable in a first direction B1 that is a counterclockwise direction and a second direction B2 that is a clockwise direction in FIG. 2. The rotation range of the lever portion 71*a* is restricted within a predetermined range. In FIG. 2, the lever portion 71*a* is arranged at a restriction position at which the lever portion 71*a* has been rotated in the clockwise direction to a limit. In FIG. 3, the lever portion 71*a* is arranged at a release position as a fixed position at which the lever portion 71*a* has been rotated in the counterclockwise direction to a limit. When the lever portion 71*a* is arranged at the restriction position of FIG. 2, the image forming apparatus 1 can form an image on a sheet. In the following description, the state in which the lever portion 71*a* of FIG. 2 is arranged at the restriction position may also be referred to simply as a restriction state, and the state in which the lever portion 71*a* of FIG. 3 is arranged at the release position may also be referred to simply as a release state. The restriction position and the release position in the following description do not only indicate the respective positions of the lever portion 71*a* at the restriction position and the release position. The restriction position and the release position may also indicate the positions of other components that move in conjunction with the lever portion 71*a*, when the lever portion 71*a* is in the restriction state and the release state.

A first portion 20A1 of the inner cover 20A is disposed downstream from the lever portion 71*a* in the counterclockwise direction in FIGS. 2 and 3. The rotation range of the lever portion 71*a* is restricted up to the release position as described above. Accordingly, fingers of the operator can be prevented from being caught between the first portion 20A 1 of the inner cover 20A and the lever portion 71*a* when the operator operates the lever portion 71*a*.

When the release lever 71 is arranged at the restriction position of FIG. 2, the restrictor 72T restricts the PCDU 10T from being detached. Alternatively, when the release lever 71 is arranged at the release position of FIG. 3, the restrictor 72T moves away from an area in which the PCDU 10T is attached to and detached from the body of the image forming apparatus 1. Accordingly, the operations of attaching and detaching the PCDU 10T to and from the body of the image forming apparatus 1 can be performed.

The restrictor 72T contacts the PCDU 10T at a position upstream from a position at which the PCDU 10T contacts the sensor 22 in a direction in which the PCDU 10T is detached to restrict the PCDU 10T from being detached. In FIG. 2, the restrictors 72C and 72T are provided for the PCDUs 10C and 10T, respectively. However, the restrictor 72 may be provided for any one or more of the above-described five PCDUs 10K, 10C, 10M, 10Y, and 10T.

Figure 4:
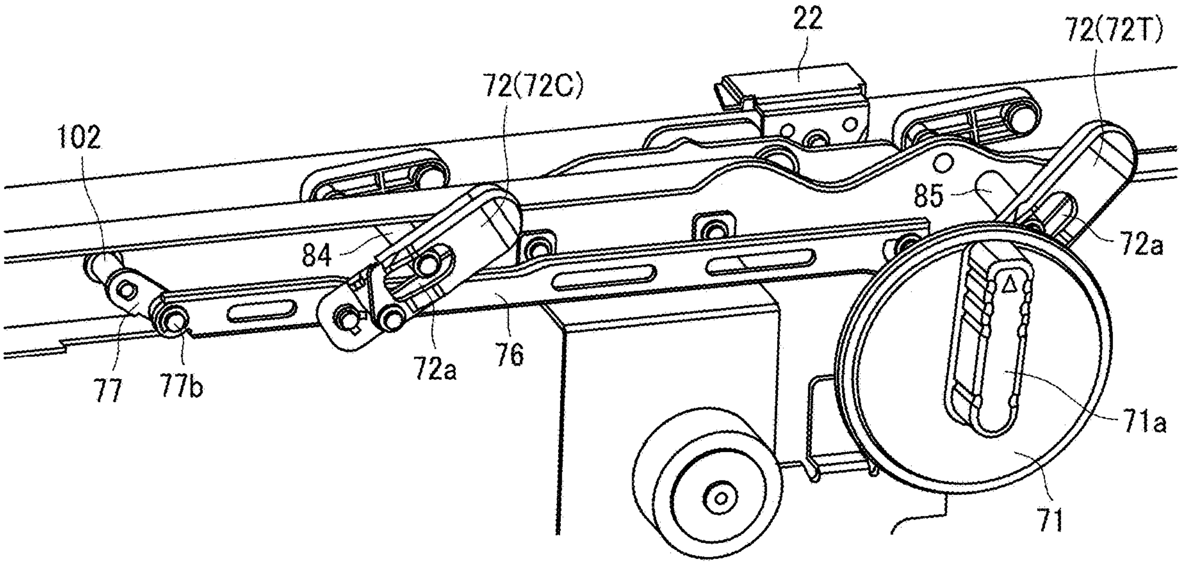
FIG. 4 is a perspective view of components around the release lever of FIG. 2 arranged at the restriction position, with an inner cover removed, according to an embodiment of the present disclosure.
Figure 5:
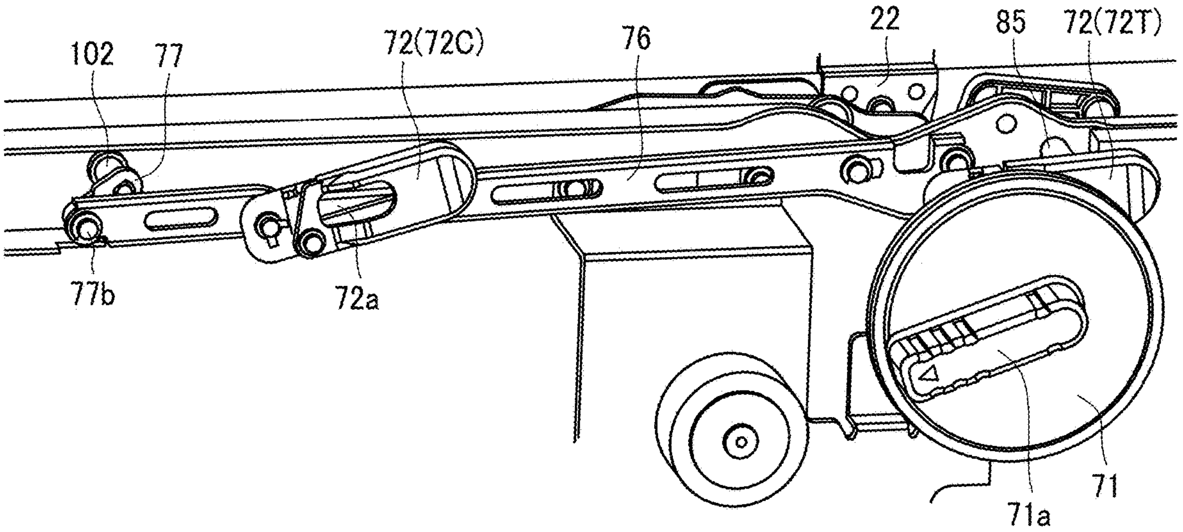
FIG. 5 is a perspective view of components around the release lever of FIG. 4 arranged at the release position, with the inner cover removed, according to an embodiment of the present disclosure.
Figure 6:
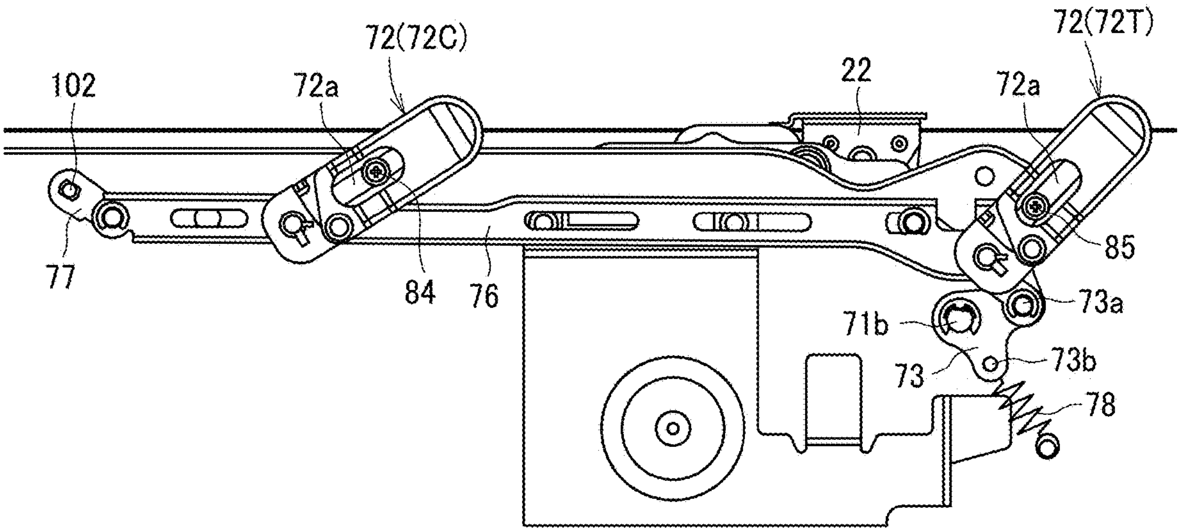
FIG. 6 is a front view of components around the release lever of FIG. 4, with the release lever removed and the components arranged at respective restriction positions, according to an embodiment of the present disclosure.
Figure 7:
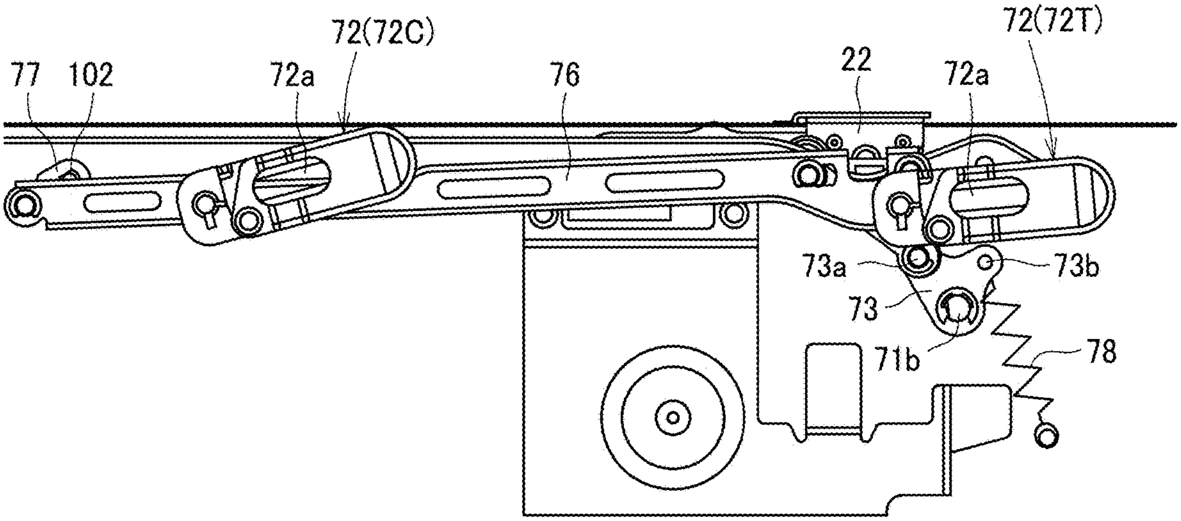
FIG. 7 is a front view of the components around the release lever of FIG. 6, with the release lever removed and the components arranged at respective release positions, according to an embodiment of the present disclosure.

Next, a mechanism that operates in conjunction with the operation of the release lever 71 is described with reference to FIGS. 4, 5, 6, and 7. FIGS. 4 and 5 are perspective views of components around the release lever 71, with the inner cover 20A removed from the configuration of FIG. 2, according to the present embodiment. FIGS. 6 and 7 are front views of the components around the release lever 71, with the release lever 71 further removed from the configuration of FIGS. 4 and 5, according to the present embodiment. In FIGS. 4 and 6, the components are arranged at the respective restriction positions. In FIGS. 5 and 7, the components are arranged at respective release positions.

As illustrated in FIGS. 4 and 5, a fourth link member 76 moves in the left-right direction in accordance with the operation of the release lever 71. An end 77*b* of a fifth link member 77 is inserted into a hole of the fourth link member 76 to couple the fifth link member 77 with the fourth link member 76. A rotation shaft 102 is inserted into another end of the fifth link member 77. Accordingly, the fifth link member 77 rotates about the rotation shaft 102. When the fourth link member 76 moves in the left-right direction, the fifth link member 77 rotates about the rotation shaft 102. In other words, the movement direction of the fifth link member 77 is restricted by the rotation direction of the fifth link member 77 about the rotation shaft 102. Accordingly, the movement direction of the fourth link member 76 is restricted.

As illustrated in FIG. 6, the first link member 73 is attached to the transfer frame via a lever fixing shaft 71*b*. The lever fixing shaft 71*b* is the rotation fulcrum of the lever portion 71*a* (see FIG. 5) of the release lever 71, and also serves as the rotation fulcrum of the first link member 73. The lever fixing shaft 71*b* is the rotation shaft to be rotated by an operation force applied to the lever portion 71*a* by an operator.

The first link member 73 is coupled with a second link member 74 and a third link member 75, which will be described below, via the coupling portion 73*a*. The first link member 73 includes an attachment 73*b* to which one end of a spring 78 is attached. The other end of the spring 78 is fixed to the transfer frame.

Due to the tensile force of the spring 78, the first link member 73 receives a force to rotate clockwise in FIG. 6 about the lever fixing shaft 71*b*. The tensile force of the spring 78 causes the lever portion 71*a* to be arranged at the restriction position illustrated in FIG. 4. Alternatively, when the lever portion 71*a* of the release lever 71 is rotated in the direction from the position in FIG. 4 to the position in FIG. 5, the first link member 73 rotates counterclockwise against the tensile force of the spring 78 and moves from the position in FIG. 6 to the position in FIG. 7. As described above, the spring 78 serves as a biasing member to bias the lever portion 71*a* in the clockwise direction in FIG. 6, which is the second direction B2.

The rotating force of the first link member 73 is transmitted to the fourth link member 76 via the second link member 74 and the third link member 75, which will be described below, and the fourth link member 76 moves in the left direction in FIG. 7. Accordingly, the restrictors 72C and 72T attached to the fourth link member 76 move to respective release positions as illustrated in FIG. 7. In other words, as illustrated in FIGS. 4 and 6, each of the restrictors 72C and 72T includes an elongated hole 72*a*. Shafts 84 and 85 that are fixed to the transfer frame are inserted into the respective elongated holes 72*a* of the restrictors 72C and 72T. The posture of the restrictor 72C is restricted within an area in which the shaft 84 can relatively move in the elongated hole 72*a*. The posture of the restrictor 72T is restricted within an area in which the shaft 85 can relatively move in the elongated hole 72*a*. Such restriction of the postures of the restrictors 72C and 72T allows the restrictors 72C and 72T to move to the respective restriction positions of FIG. 6 or the respective release positions of FIG. 7 in conjunction with the movement of the fourth link member 76. A hole of the restrictor 72 as viewed from the front side of the restrictor 72 is a portion of the elongated hole 72*a*. In FIG. 7, the shafts 84 and 85 are disposed in hidden parts of the elongated holes 72*a* (see FIG. 17).

Figure 8:
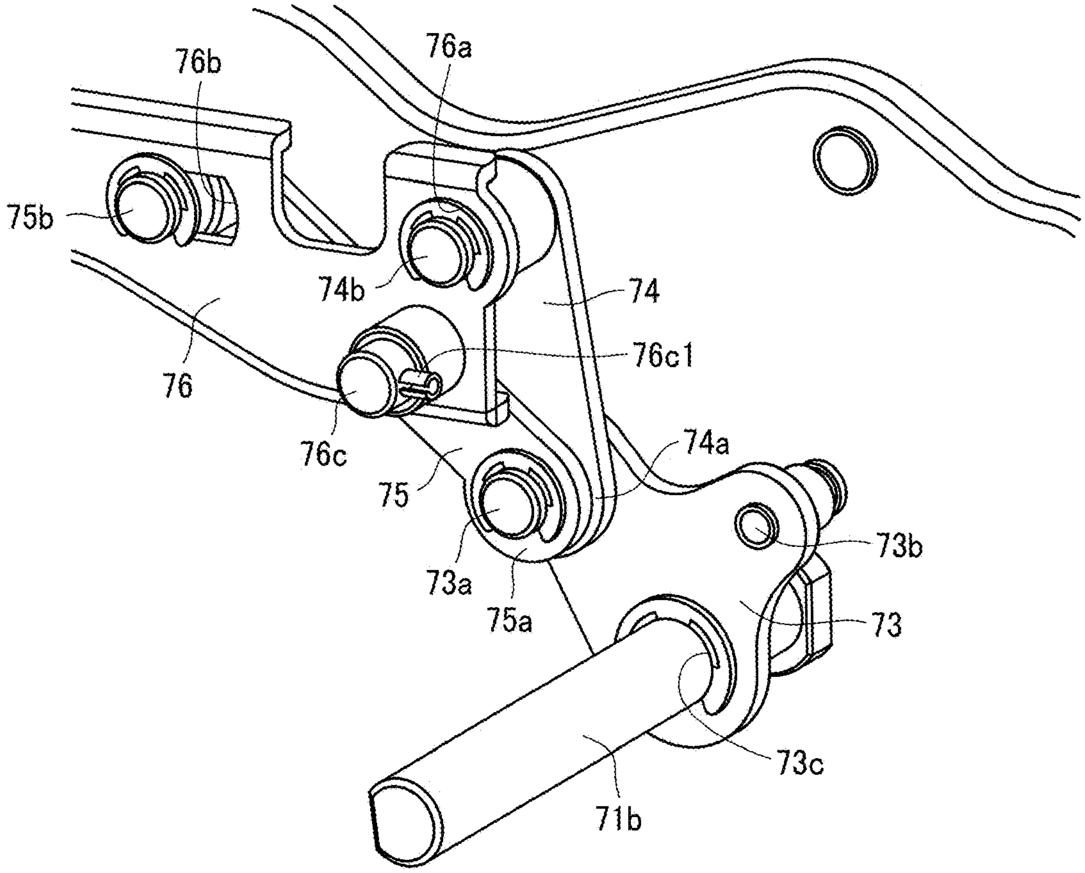
FIG. 8 is a perspective view of a lever fixing shaft, a first link member, a second link member, a third link member, and a fourth link member, according to an embodiment of the present disclosure.
Figure 9:
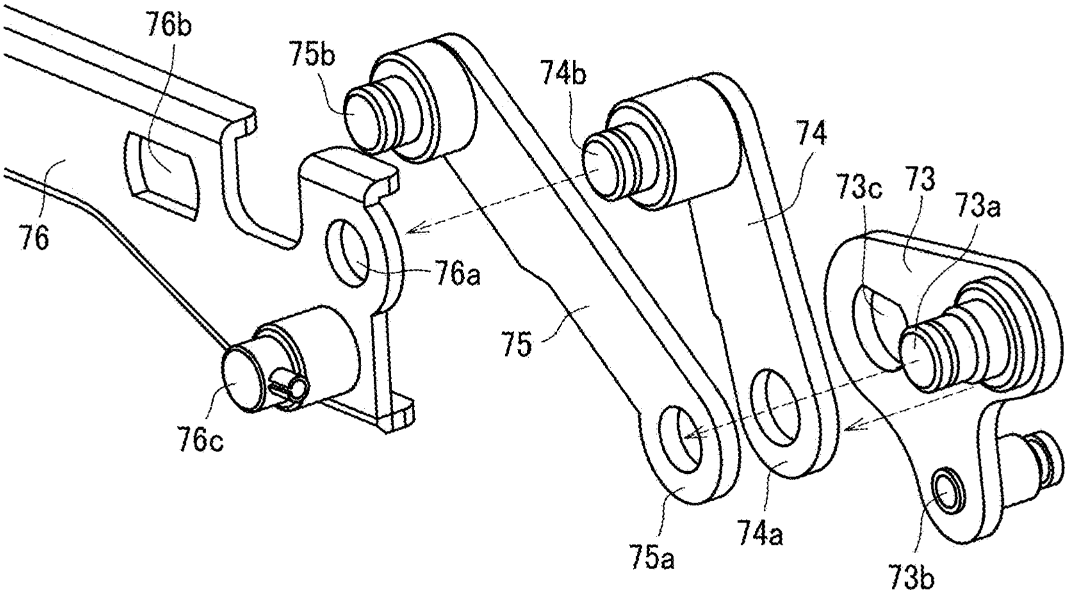
FIG. 9 is an exploded perspective view of the first link member, the second link member, the third link member, and the fourth link member of FIG. 8.

Next, the second link member 74, the third link member 75, and the first link member 73 and the fourth link member 76 coupled with the second link member 74 and the third link member 75 are described with reference to FIGS. 8 and 9. FIG. 8 is a perspective view of the lever fixing shaft 71*b*, the first link member 73, the second link member 74, the third link member 75, and the fourth link member 76, with the restrictor 72T removed from the configuration of FIG. 7, according to the present embodiment. FIG. 9 is an exploded perspective view of the first link member 73, the second link member 74, the third link member 75, and the fourth link member 76, according to the present embodiment.

As illustrated in FIGS. 8 and 9, the coupling portion 73*a* of the first link member 73 is inserted into a hole disposed in an end 74*a* of the second link member 74 and a hole disposed in an end 75*a* of the third link member 75. Accordingly, the first link member 73, the second link member 74, and the third link member 75 are coupled with each other. An E ring is interposed between the end 74*a* of the second link member 74 and the end 75*a* of the third link member 75 to reduce the area of contact between the end 74*a* and the end 75*a*.

An insertion portion 74*b* that is another end of the second link member 74 is inserted into a hole 76*a* of the fourth link member 76 to couple the second link member 74 with the fourth link member 76. An insertion portion 75*b* that is another end of the third link member 75 is inserted into an elongated hole 76*b* of the fourth link member 76. Accordingly, the insertion portion 75*b* is relatively movable in the elongated hole 76*b*. The first link member 73 includes an insertion hole 73*c* into which the lever fixing shaft 71*b* is inserted. As illustrated in FIG. 8, E rings are also interposed between the first link member 73 and the lever fixing shaft 71*b*, between the coupling portion 73*a* and the third link member 75, between the insertion portion 75*b* and the fourth link member 76, and between the insertion portion 74*b* and the fourth link member 76.

The fourth link member 76 includes an insertion portion 76*c*. The insertion portion 76*c* is a portion to insert into a hole disposed in the restrictor 72T (see FIG. 6) and to which the restrictor 72T is attached.

Figure 10:
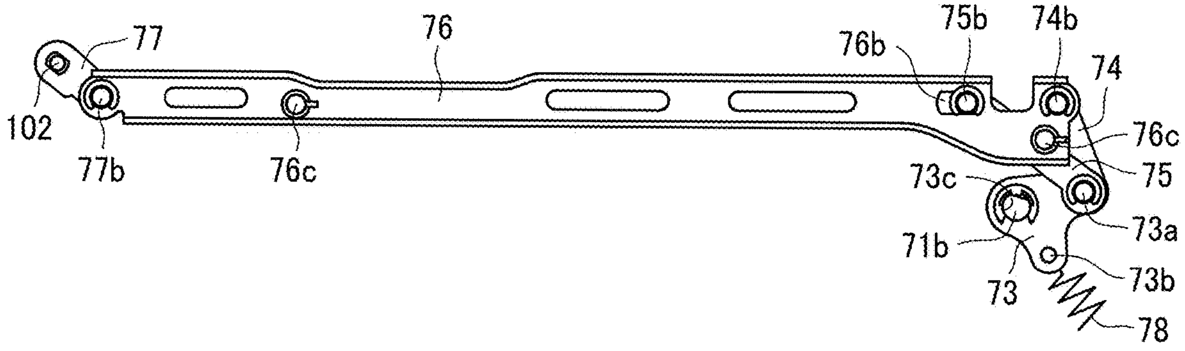
FIG. 10 is a front view of a first link member, a second link member, a third link member, a fourth link member, and a fifth link member arranged at respective restriction positions, according to an embodiment of the present disclosure.
Figure 11:
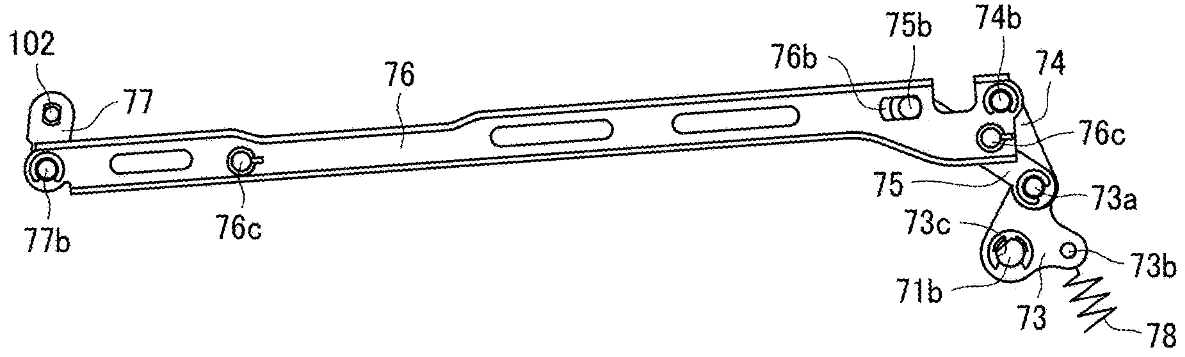
FIG. 11 is a front view of the first link member, the second link member, the third link member, the fourth link member, and the fifth link member of FIG. 10 in the process of moving from the respective restriction positions to respective release positions, according to an embodiment of the present disclosure.
Figure 12:
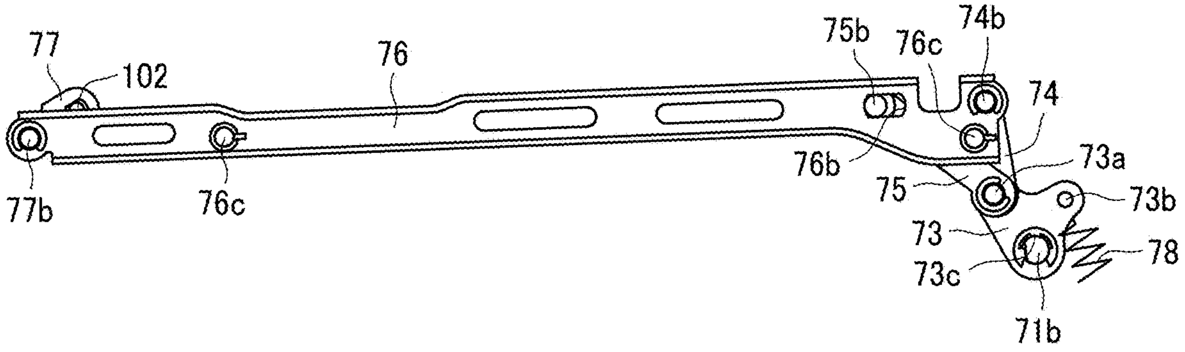
FIG. 12 is a front view of the first link member, the second link member, the third link member, the fourth link member, and the fifth link member of FIG. 9 arranged at respective release positions, according to an embodiment of the present disclosure.

Next, the movement of the fourth link member 76 is described with reference to FIGS. 10, 11, and 12. The rotation of the first link member 73 about the lever fixing shaft 71*b* transmits a rotating force to the fourth link member 76 via the second link member 74 and the third link member 75. Accordingly, the fourth link member 76 moves in the left-right direction in FIG. 6. FIG. 10 is a front view of the first link member 73, the second link member 74, the third link member 75, and the fourth link member 76 in which the first link member 73, the second link member 74, the third link member 75, and the fourth link member 76 are arranged at the respective restriction positions, according to the present embodiment. FIG. 11 is a front view of the first link member 73, the second link member 74, the third link member 75, and the fourth link member 76 in the process of moving from the respective restriction positions to the respective release positions, according to the present embodiment. FIG. 12 is a front view of the first link member 73, the second link member 74, the third link member 75, and the fourth link member 76 arranged at the respective release positions, according to the present embodiment.

In FIGS. 10, 11, and 12, the lever fixing shaft 71*b* and the rotation shaft 102 of the fifth link member 77 are rotatably supported by the transfer frame. Accordingly, the positions of the lever fixing shaft 71*b* and the rotation shaft 102 do not change.

When the first link member 73 rotates counterclockwise about the lever fixing shaft 71*b* as illustrated in FIGS. 10 and 11, the second link member 74 and the third link member 75, which are coupled with the first link member 73 at the coupling portion 73*a*, change the respective positions in conjunction with the first link member 73. Along with the movement of the second link member 74 and the third link member 75, the fourth link member 76 coupled with the second link member 74 at the position of the insertion portion 74*b* moves in the left-right direction in FIG. 10 and the fifth link member 77 rotates about the rotation shaft 102.

The insertion portion 75*b* of the third link member 75 is inserted into the elongated hole 76*a* of the fourth link member 76. By so doing, the position at which the fourth link member 76 moves in the left-right direction in FIG. 10 is determined. In other words, the lever fixing shaft 71*b* and the rotation shaft 102 are fixed to the transfer frame. Accordingly, the positions of the second link member 74 and the fourth link member 76 disposed between the lever fixing shaft 71*b* and the rotation shaft 102 are variable. For this reason, coupling only the second link member 74 with the fourth link member 76 does not determine the position of the fourth link member 76 relative to the positional change of the first link member 73 by the rotation of the first link member 73. However, the movement range of the insertion portion 75*b*, which is the other end of the third link member 75, is restricted within the elongated hole 76*b* of the fourth link member 76. By so doing, the relative positions of the third link member 75 and the fourth link member 76 are restricted. For this reason, the positions of the first link member 73 and the fourth link member 76 can correspond to each other on a one-to-one basis. Accordingly, the rotation of the first link member 73 allows the fourth link member 76 to be moved to a predetermined position. Accordingly, the restrictor 72T (see FIG. 7) attached to the insertion portion 76*c* of the fourth link member 76 can be moved between the restriction position illustrated in FIG. 10 and the release position illustrated in FIG. 12. At the restriction position illustrated in FIG. 10, the insertion portion 75*b* of the third link member 75 is arranged at one end of the elongated hole 76*b* of the fourth link member 76. Accordingly, the fourth link member 76 is restricted from moving further leftward in FIG. 10. At the release position illustrated in FIG. 12, the insertion portion 75*b* is arranged at another end of the elongated hole 76*b*. Accordingly, the fourth link member 76 is restricted from moving further rightward in FIG. 12.

When the lever portion 71*a* (see FIG. 2) of the release lever 71 is operated to rotate by the operation force, the first link member 73 is rotated counterclockwise to move to the release position illustrated in FIG. 12. On the other hand, the force in the clockwise direction is applied to the first link member 73 by the spring 78. Accordingly, when the operation force is released in a state in which the first link member 73 is arranged at a position other than the release position, the first link member 73 automatically returns to the restriction position illustrated in FIG. 10.

Figure 13:
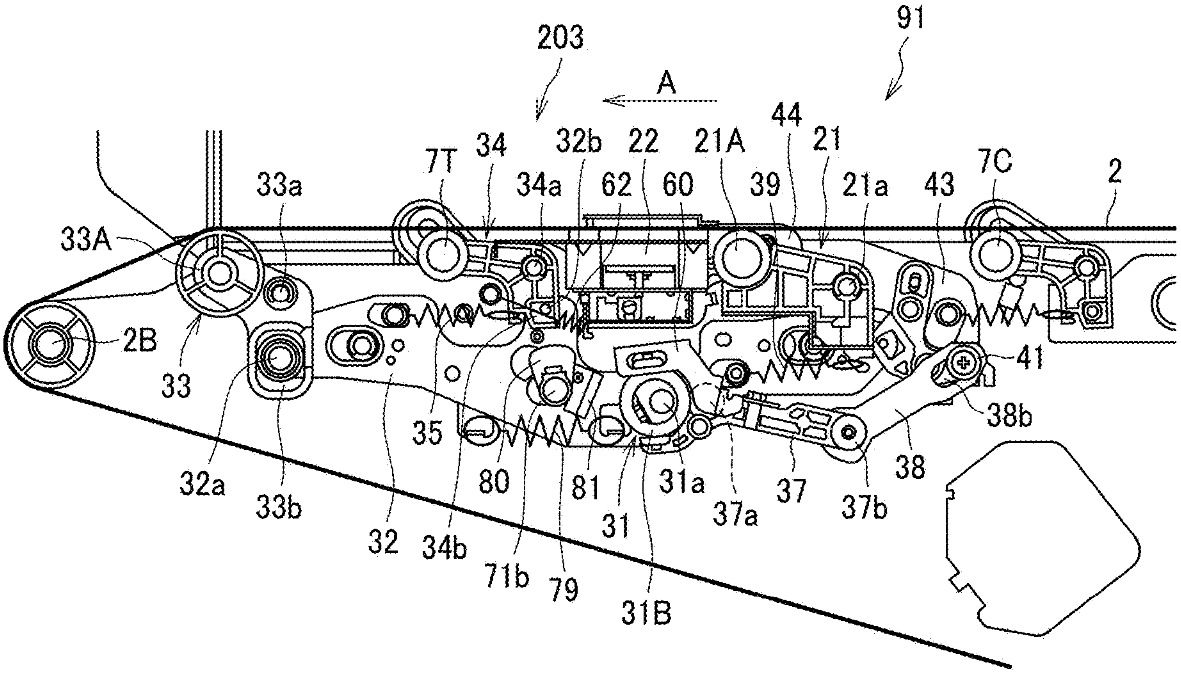
FIG. 13 is a cross-sectional view of a transfer device viewed from the back side of the image forming apparatus of FIG. 1, in which a primary transfer roller of a most-downstream primary transfer section is arranged at a contact position relative to an intermediate transfer belt, according to an embodiment of the present disclosure.
Figure 14:
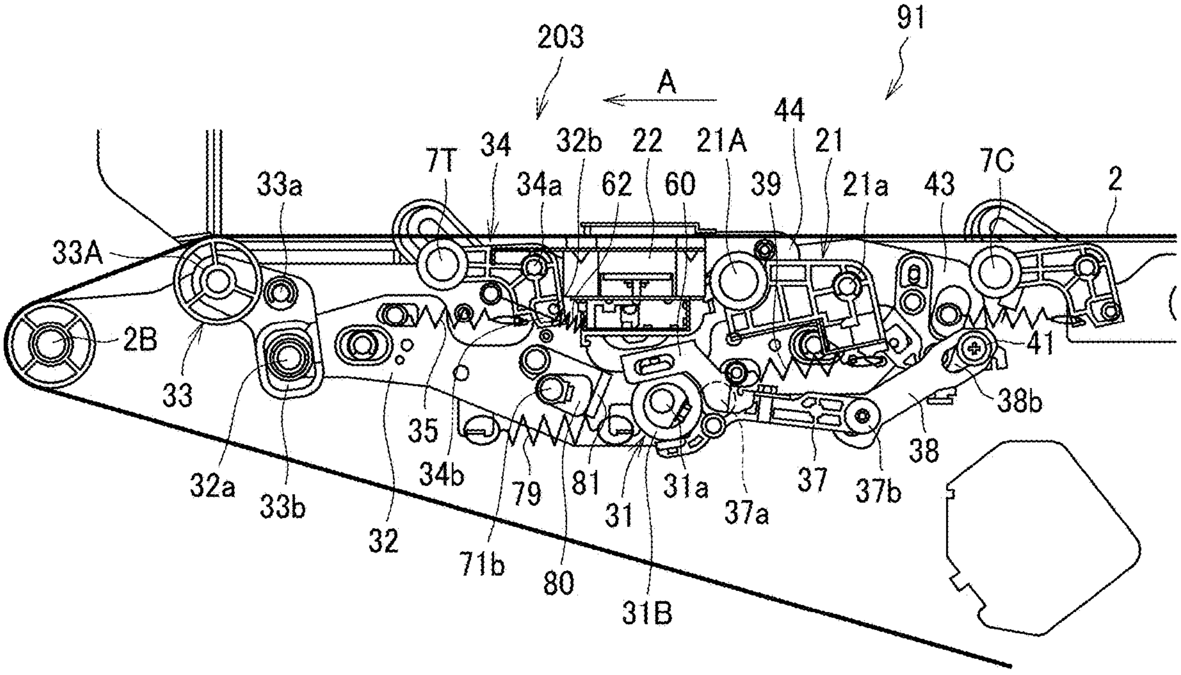
FIG. 14 is a cross-sectional view of the transfer device of FIG. 13, in which the primary transfer roller of the most-downstream primary transfer section is arranged at a separation position relative to the intermediate transfer belt, according to an embodiment of the present disclosure.

On the other hand, when the first link member 73 is arranged at the release position illustrated in FIG. 12, the first link member 73 is fixed at the release position. As a result, even if the operation force applied to the lever portion 71*a* is released when the first link member 73 is arranged at the release position, the lever portion 71*a* and the first link member 73 do not return to the restriction positions. A fixing mechanism that fixes the lever portion 71*a* and the first link member 73 at the respective release positions is described below with reference to FIGS. 13 and 14. FIG. 13 and FIG. 14 are cross-sectional views of the transfer device 20 viewed from the back side of the image forming apparatus 1, according to the present embodiment. In FIG. 13, the lever portion 71*a* and the first link member 73 are arranged at the respective restriction positions. In FIG. 14, the lever portion 71*a* and the first link member 73 are arranged at the respective release positions.

As illustrated in FIG. 13, one end of a spring 79 is connected to the front slider 32, which is a mechanism for causing the primary transfer roller 7T to contact with and separate from the intermediate transfer belt 2. The other end of the spring 79 is fixed to the transfer frame to bias the front slider 32 in the left direction in FIG. 13. A cam follower 81 is attached to the front slider 32.

A cam 80 is attached to the lever fixing shaft 71*b*, which is the rotation shaft of the release lever 71. When the lever portion 71*a* and the first link member 73 are arranged at the respective restriction positions as illustrated in FIG. 13, the cam 80 is not in contact with the cam follower 81. On the other hand, when the lever portion 71*a* and the first link member 73 are arranged at the respective release positions as illustrated in FIG. 14, operating the release lever 71 causes the lever fixing shaft 71*b* to rotate, thus causing the cam 80 to rotate. By so doing, the cam 80 contacts the cam follower 81. The cam follower 81 disposed on the front slider 32 is biased in the left direction in FIG. 14. The cam follower 81 contacts the cam 80. Accordingly, the position of the cam 80, in other words, the rotation phase of the lever fixing shaft 71*b* is fixed. As a result, the lever portion 71*a* of the release lever 71 is fixed at the release position.

As described above, the lever portion 71*a* automatically returns to the restriction position other than when the lever portion 71*a* is arranged at the release position. By so doing, the lever portion 71*a* can be prevented from being held at a halfway position between the release position and the restriction position. When the PCDU 10T is pulled out in a state in which the lever portion 71*a* is held at the above-described halfway position, the PCDU 10T may be pulled out in a state in which, for example, the sensor 22 and other components to be described below are not sufficiently moved away from the PCDU 10T. As a result, for example, the sensor 22 and the intermediate transfer belt 2 may be damaged or broken. In the present embodiment, the damage and breakage of the sensor 22 and the intermediate transfer belt 2 as described above can be prevented. For example, the cam 80, the cam follower 81, the front slider 32, and the spring 78 constitute the fixing mechanism to fix the lever portion 71*a* of the release lever 71 at the release position.

A description is given below of a mechanism that limits the rotation range of the release lever 71 to a range from the restriction position of FIG. 2 to the release position of FIG. 3. The movement range of the insertion portion 76*c* is restricted within the elongated hole 76*b* and the rotation range of the fifth link member 77 is restricted as illustrated in FIG. 10. Accordingly, the rotation range of the release lever 71 is limited. The restriction of the rotation range of the fifth link member 77 is described with reference to FIGS. 15A and 15B.

Figure 15A:
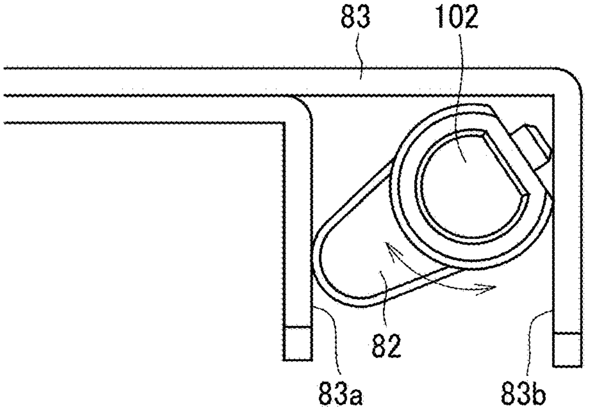
FIGS. 15A and 15B are diagrams illustrating a configuration around a fifth link member in which the rotation range of the fifth link member is restricted, according to an embodiment of the present disclosure.
Figure 15B:
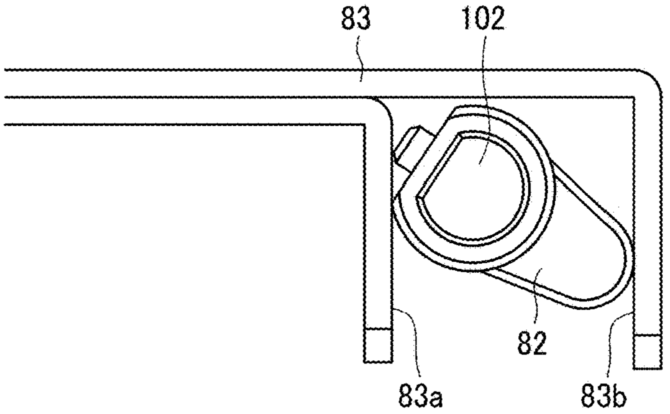

The rotation shaft 102 illustrated in FIG. 4 includes a cam 82 illustrated in FIG. 15A. The cam 82 rotates about the rotation shaft 102 in directions indicated by a double-headed arrow in FIG. 15A. The cam 82 contacts a wall surface 83*a* of one side surface of the cam follower 83 and a wall surface 83*b* of another side surface of the cam follower 83. Thus, the rotation range of the cam 82 is restricted. In other words, the cam 82 rotates in a range from a position at which the cam 82 rotates clockwise to a limit as illustrated in FIG. 15A to a position at which the cam 82 rotates counterclockwise to a limit as illustrated in FIG. 15B. The rotation range of the cam 82 is restricted as described above. In addition, the movement range of the insertion portion 76*c* is restricted within the elongated hole 76*b*. Accordingly, the rotation range of the release lever 71 is limited to the range illustrated in FIGS. 2 and 3.

Figure 16:
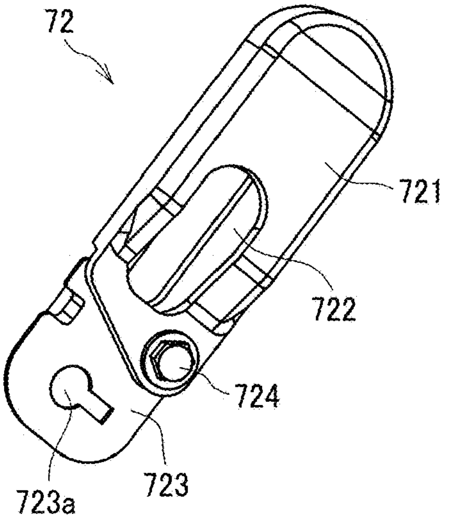
FIG. 16 is a perspective view of a restrictor viewed from a front side of the image forming apparatus of FIG. 1, according to an embodiment of the present disclosure.
Figure 17:
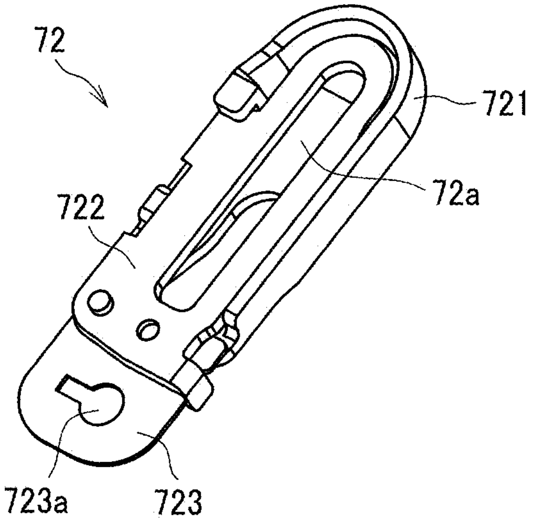
FIG. 17 is a perspective view of the restrictor of FIG. 16 viewed from a rear side of the image forming apparatus of FIG. 1.
Figure 18:
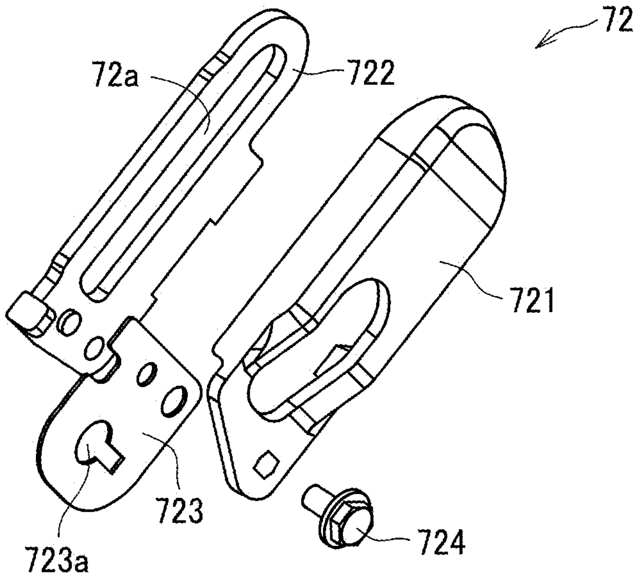
FIG. 18 is an exploded perspective view of the restrictor of FIG. 16.

A detailed configuration of the restrictor 72 is described below with reference to FIGS. 16, 17, and 18. FIG. 16 is a perspective view of the restrictor 72 viewed from the front side of the image forming apparatus 1, according to the present embodiment. FIG. 17 is a perspective view of the restrictor 72 viewed from the rear side of the image forming apparatus 1, according to the present embodiment. FIG. 18 is an exploded perspective view of the restrictor 72, according to the present embodiment.

The restrictor 72 includes a front cover 721, a rear cover 722, an attachment portion 723, and a fixing screw 724. The front cover 721, the rear cover 722, and the attachment portion 723 are assembled together by the fixing screw 724. The front cover 721 and the rear cover 722 serve as restrictors that contact with the PCDU 10 to restrict the movement of the PCDU 10 in a direction in which the PCDU 10 is pulled out. The attachment portion 723 is elastically deformable and is formed by a plate spring in the present embodiment. The attachment portion 723 has an insertion hole 723*a* into which the insertion portion 76*c* (see FIG. 8) of the fourth link member 76 inserts.

As illustrated in FIG. 8, the insertion portion 76*c* includes a slip-off stopper pin 76*c*1 to prevent the insertion portion 76*c* from being disengaged from the insertion hole 723*a*. The slip-off stopper pin 76*c*1 is a spring pin. As illustrated in FIG. 16, the insertion hole 723*a* has a shape corresponding to the insertion portion 76*c* and the slip-off stopper pin 76*c*1. When the insertion portion 76*c* inserts into the insertion hole 723*a*, the insertion portion 76*c* inserts such that the position of the slip-off stopper pin 76*c*1 aligns with the position of the insertion hole 723*a*. Within the movement range of the restrictor 72 after the insertion portion 76*c* has inserted, the slip-off stopper pin 76*c*1 is not aligned with the insertion hole 723*a*. Such a simple configuration as described above can prevent the insertion portion 76*c* from being disengaged from the insertion hole 723*a*. Only one slip-off stopper pin 76*c*1 is disposed in the circumferential direction of the insertion portion 76*c* to protrude in only one direction of the insertion portion 76*c*. For example, in comparison to a configuration in which the slip-off stopper pins 76*c*1 are disposed at two positions in the circumferential direction of the insertion portion 76*c*, in the present embodiment, the area of the insertion hole 723*a* can be reduced. Accordingly, the strength of the attachment portion 723 can be enhanced.

The restrictor 72 is attached to the transfer device 20 by the attachment portion 723, which is an elastically deformable portion. Accordingly, damage to the link members such as the fourth link member 76 can be prevented. In other words, when an operator tries to pull out the PCDU 10 with a strong force in a state in which the restrictor 72 is arranged at the restriction position as illustrated in FIG. 2, the PCDU 10 strongly collides with the restrictor 72. At this time, the attachment portion 723 elastically deforms to absorb an impact caused by the collision of the attachment portion 723 with the restrictor 72. Accordingly, a pressure applied to the link members such as the fourth link member 76 can be reduced. The attachment portion 723 may be formed of, for example, rubber. However, in consideration of the slidability of the attachment portion 723 with the shafts 84 and 85 (see FIG. 4), preferably, metal plate such as the plate spring of the present embodiment or a plate having a thickness of 0.5 mm or less may be employed for the attachment portion 723.

Further, in the present embodiment, components such as the sensor 22 disposed in the transfer device 20 are movable in a direction away from the PCDU 10T. Accordingly, for example, the sensor 22 moves in the direction away from the PCDU 10T in conjunction with an operation in which the lever portion 71*a* of the release lever 71 is moved from the restriction position to the release position.

In the following description, the primary transfer rollers 7T, 7C, 7M, 7Y, and 7K and the sensor 22 provided for the transfer device 20 are described first. Then, a moving assembly that separates, for example, the sensor 22 from the PCDU 10T is described.

Figure 19A:
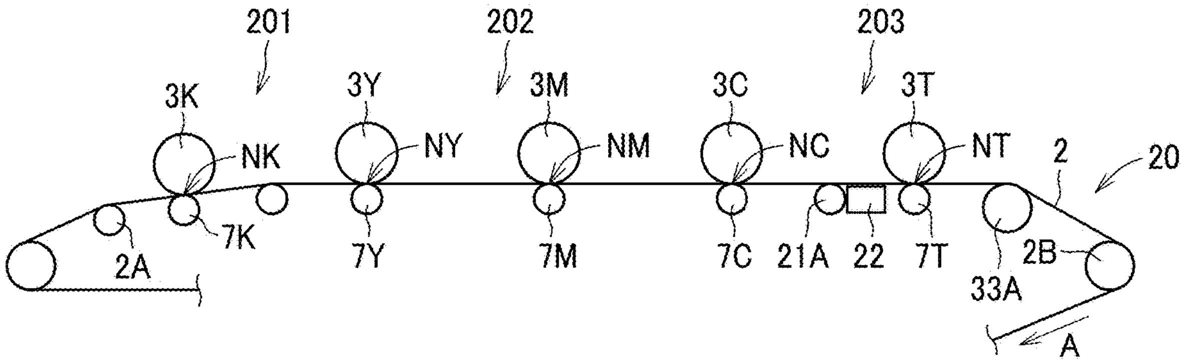
FIGS. 19A and 19B are schematic diagrams illustrating configurations of a transfer device according to an embodiment of the present disclosure.

As illustrated in FIG. 19A, the primary transfer roller 7T and the photoconductor 3T form a special color transfer nip NT with the intermediate transfer belt 2 interposed between the primary transfer roller 7T and the photoconductor 3T. The primary transfer roller 7C and the photoconductor 3C form a cyan transfer nip NC with the intermediate transfer belt 2 interposed between the primary transfer roller 7C and the photoconductor 3C. The primary transfer roller 7M and the photoconductor 3M form a magenta transfer nip NM with the intermediate transfer belt 2 interposed between the primary transfer roller 7M and the photoconductor 3M. The primary transfer roller 7Y and the photoconductor 3Y form a yellow transfer nip NY with the intermediate transfer belt 2 interposed between the primary transfer roller 7Y and the photoconductor 3Y. The primary transfer roller 7K and a photoconductor 3K form a black transfer nip NK with the intermediate transfer belt 2 interposed between the primary transfer roller 7K and the photoconductor 3K.

The transfer device 20 includes a most-upstream primary transfer section 201 disposed most upstream in the rotation direction of the intermediate transfer belt 2, a most-downstream primary transfer section 203 disposed most downstream in the rotation direction of the intermediate transfer belt 2, and a central primary transfer section 202 including the multiple primary transfer rollers 7Y, 7M, and 7C disposed between the most-upstream primary transfer section 201 and the most-downstream primary transfer section 203. In the present embodiment, the most-upstream primary transfer section 201 transfers a black toner image at the black transfer nip NK, the central primary transfer section 202 transfers a cyan toner image at the cyan transfer nip NC, a magenta toner image at the magenta transfer nip NM, and a yellow toner image at the yellow transfer nip NY to the intermediate transfer belt 2. The most-downstream primary transfer section 203 transfers a special color toner image at the special color transfer nip NT to the intermediate transfer belt 2. In the following description, upstream or downstream in the rotation direction of the intermediate transfer belt 2 may also be referred to simply as upstream or downstream.

Between the primary transfer roller 7C and the primary transfer roller 7T in the rotation direction of the intermediate transfer belt 2, a driven roller 21A as a tension member and the sensor 22 as a sensor are disposed. The driven roller 21A stretches the intermediate transfer belt 2. The sensor 22 detects a scale on the intermediate transfer belt 2 and detects the rotation speed of the intermediate transfer belt 2. Controlling the rotation speed of the intermediate transfer belt 2 based on the detection result of the sensor 22 prevents positional shift of toner images of the colors to be transferred to the intermediate transfer belt 2.

In FIG. 19A, the primary transfer roller 7K disposed in the most-upstream primary transfer section 201 is a most-upstream primary transferor, the primary transfer rollers 7Y, 7M, and 7C disposed in the central primary transfer section 202 are central primary transferors, and the primary transfer roller 7T disposed in the most-downstream primary transfer section 203 is a most-downstream primary transferor. The rotation direction of the intermediate transfer belt 2 is a direction indicated by arrow A in FIG. 19A. The primary transfer rollers 7K, 7Y, 7M, and 7C upstream from the primary transfer roller 7T in the rotation direction of the intermediate transfer belt 2 are also upstream primary transferors.

In the present embodiment, a toner image of the special color can be transferred to the intermediate transfer belt 2 in any of the most-upstream primary transfer section 201 and the most-downstream primary transfer section 203. Accordingly, a toner image of the special color can be transferred in a desired order.

Between the primary transfer roller 7C and the primary transfer roller 7T in the rotation direction of the intermediate transfer belt 2, the driven roller 21A as a second tension roller and the sensor 22 as a sensor are disposed. The driven roller 21A stretches the intermediate transfer belt 2. The sensor 22 detects a scale on the intermediate transfer belt 2 and detects the rotation speed of the intermediate transfer belt 2. Controlling the rotation speed of the intermediate transfer belt 2 based on the detection result of the sensor 22 prevents the positional shift of toner images of the colors to be transferred to the intermediate transfer belt 2.

Figure 19B:
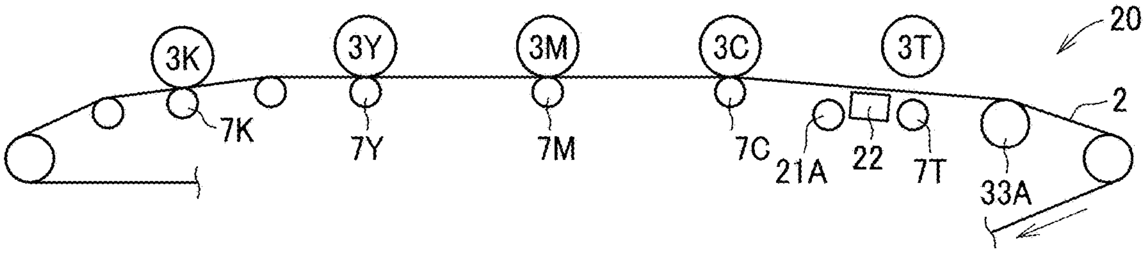

In the transfer device 20 according to the present embodiment, the multiple primary transfer rollers 7K, 7Y, 7M, 7C, and 7T contact with and separate from the photoconductors 3K, 3Y, 3M, 3C, and 3T, respectively, with the intermediate transfer belt 2 interposed between the primary transfer rollers 7K, 7Y, 7M, 7C, and 7T and the photoconductors 3K, 3Y, 3M, 3C, and 3T, respectively, in accordance with modes of image formation. For example, as illustrated in FIG. 19B, the primary transfer roller 7T of the most-downstream primary transfer section 203 can be separated from the photoconductor 3T, and the other primary transfer rollers 7K, 7Y, 7M, and 7C can contact the photoconductors 3K, 3Y, 3M, and 3C, respectively, via the intermediate transfer belt 2. FIG. 19B is a diagram illustrating a configuration in which the primary transfer roller 7K of the most-upstream primary transfer section 201, the primary transfer rollers 7Y, 7M, and 7C of the central primary transfer section 202, and the primary transfer roller 7T of the most-downstream primary transfer section 203 can be switched between the contact positions and the separation positions.

The driven rollers 21A and 33A as tension members, around which the intermediate transfer belt 2 is stretched, and the sensor 22 also move in a direction toward or away from the photoconductor 3T in conjunction with the movement of the primary transfer roller 7T toward or away from the photoconductor 3T. The direction in which the driven rollers 21A and 33A and the sensor 22 moves toward or away from the photoconductor 3T is the vertical direction in FIG. 19B. In the following description, a first moving assembly 91 that moves the driven rollers 21A and 33A and the sensor 22 toward and away from the photoconductor 3T as a first mover is described with reference to FIG. 13 and FIGS. 20, 21, and 22. As described above, FIG. 13 is a cross-sectional view of the transfer device 20 in which the lever portion 71*a* and the first link member 73 are arranged at the respective restriction positions as described above and also in which the front slider 32 is arranged at the contact position, according to the present embodiment. The following description describes a case in which a toner image of a special color is transferred by the primary transfer roller 7T of the most-downstream primary transfer section 203. However, a toner image of black color may be transferred by the primary transfer roller 7T of the most-downstream primary transfer section 203.

As illustrated in FIG. 13, the primary transfer roller 7T is disposed at one end of a rotator 34. The rotator 34 is rotatable about a rotation fulcrum 34*a*. The rotator 34 includes a hole 34*b* at an end of the rotator 34 opposite to another end of the rotator 34 on which the primary transfer roller 7T is disposed. A pin 32*b* disposed on the front slider 32 is inserted into the hole 34*b*. A spring 35 is fixed to a housing of the image forming apparatus 1 and biases the rotator 34 in a direction in which the rotator 34 rotates clockwise in FIG. 13 about the rotation fulcrum 34*a*. Due to the biasing force of the spring 35, the primary transfer roller 7T contacts the intermediate transfer belt 2. The driven roller 33A, which is one of tension members around which the intermediate transfer belt 2 is stretched, is disposed at one end of the rotator 33. The rotator 33 is rotatable about a rotation fulcrum 33*a*. The rotator 33 includes a hole 33*b* at an end of the rotator 33 opposite to another end of the rotator 33 on which the driven roller 33A is disposed. An insertion portion 32*a* disposed on the front slider 32 inserts into the hole 33*b*. The insertion portion 32*a* is formed by press-fitting a ball bearing into a shaft fixed to the front slider 32. The driven roller 21A is disposed at one end of the rotator 21. The rotator 21 is rotatable about a rotation fulcrum 21*a*. The rotator 21 receives a force from a spring 39 acting in a direction such that the rotator 21 rotates clockwise about the rotation fulcrum 21*a*.

Figure 20:
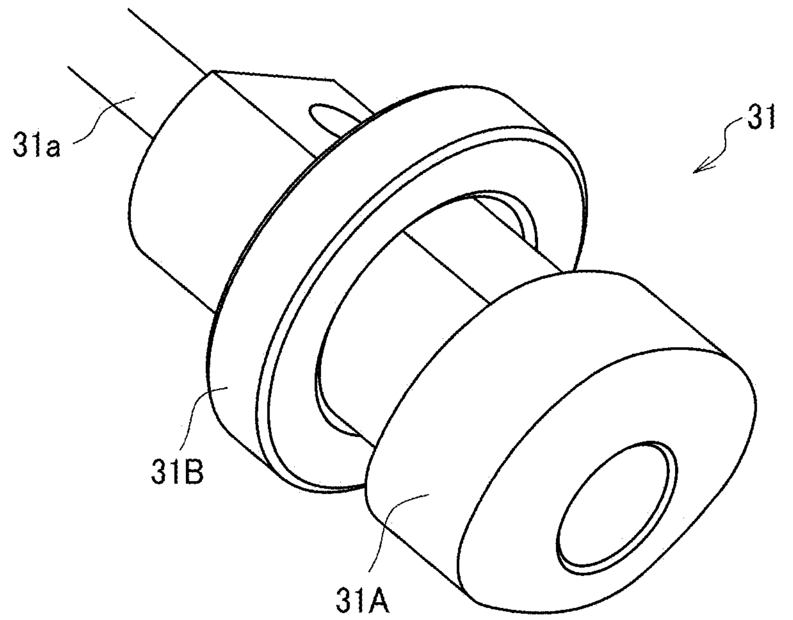
FIG. 20 is a perspective view of a cam according to an embodiment of the present disclosure.

The first moving assembly 91 includes a cam 31 to which the driving force of a motor is transmitted. As illustrated in FIG. 20, the cam 31 includes a first cam 31A and a second cam 31B and is rotatable about a rotation shaft 31*a*. The second cam 31B is a ball bearing having an outer ring. The second cam 31B is eccentric with respect to the rotation shaft 31*a*.

Figure 21:
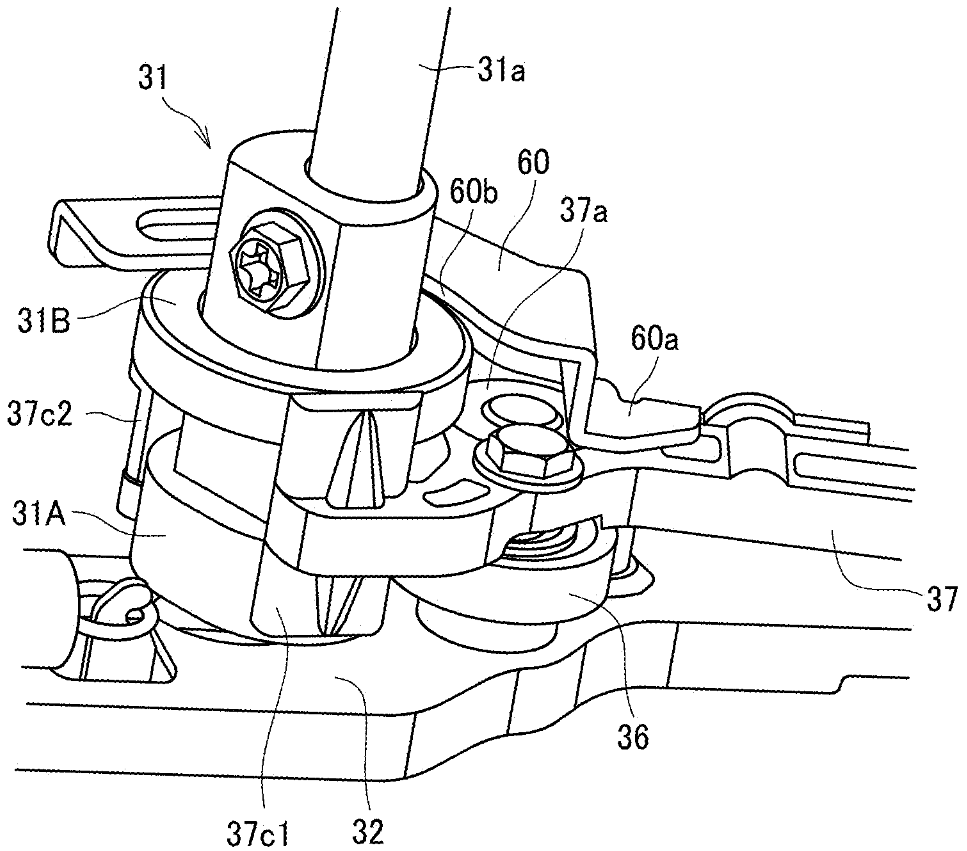
FIG. 21 is a perspective view of a cam and components around the cam viewed from the back side of FIG. 12, according to an embodiment of the present disclosure.

The first cam 31A includes a small-diameter portion, a medium-diameter portion, and a large-diameter portion each having a different diameter by 120 degrees. As illustrated in FIG. 21, the first cam 31A is in contact with a cam follower 36 formed of a ball bearing. Rotation of the first cam 31A changes the surface of the first cam 31A that contacts the cam follower 36. By so doing, the front slider 32 can be moved in the left-right direction in FIG. 13.

Figure 22:
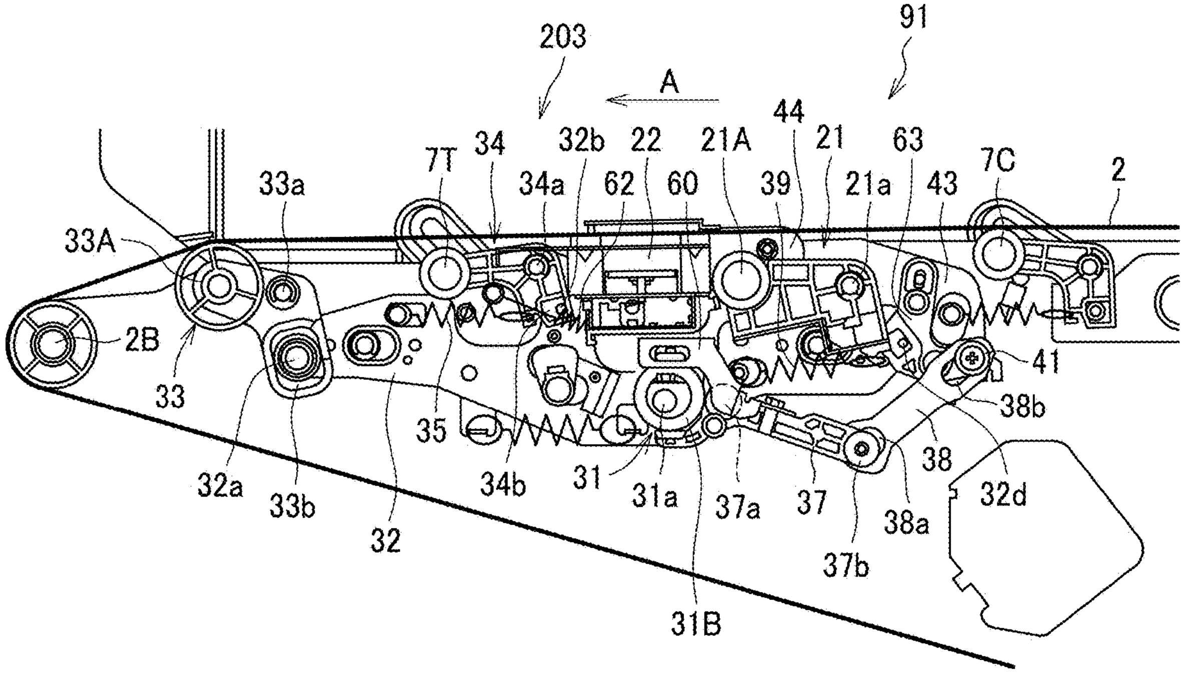
FIG. 22 is a cross-sectional view of a moving assembly of moving a most-downstream primary transfer section toward an intermediate transfer belt, which is viewed from the back side of the image forming apparatus of FIG. 1, according to an embodiment of the present disclosure.

FIG. 22 is a cross-sectional view of the first moving assembly 91 viewed from the rear side of the image forming apparatus 1, illustrating a case in which the primary transfer roller 7T is separated from the photoconductor 3T via the intermediate transfer belt 2.

Rotation of the first cam 31A causes the front slider 32 to move further in the right direction than the position of the front slider 32 in FIG. 13. By so doing, the primary transfer roller 7T is separated from the photoconductor 3T via the intermediate transfer belt 2. In other words, when the front slider 32 moves in the right direction from the position of the front slider 32 in FIG. 13 to the position of the front slider 32 in FIG. 22, the insertion portion 32*a*, the pin 32*b*, and the pin 32*c* (see FIG. 24) disposed in the front slider 32 press the rotators 33, 34, and 21, respectively. Accordingly, the rotators 33, 34, and 21 rotate counterclockwise. As a result, the driven roller 33A, the primary transfer roller 7T, and the driven roller 21A move downward in FIG. 22, that is, in a direction away from the photoconductor 3T. The driven roller 33A and the driven roller 21A move as described above. By so doing, stretch positions at which the intermediate transfer belt 2 is stretched by the driven roller 33A, the primary transfer roller 7T, and the driven roller 21A move downward in FIG. 22.

When the front slider 32 moves in the right direction from the position illustrated in FIG. 13 to the position illustrated in FIG. 22, the sensor 22 moves downward in FIG. 22. As a result, the sensor 22 can be moved in accordance with the stretch position at which the intermediate transfer belt 2 is stretched. A mechanism that moves the sensor 22 is described in the following description.

Figure 23:
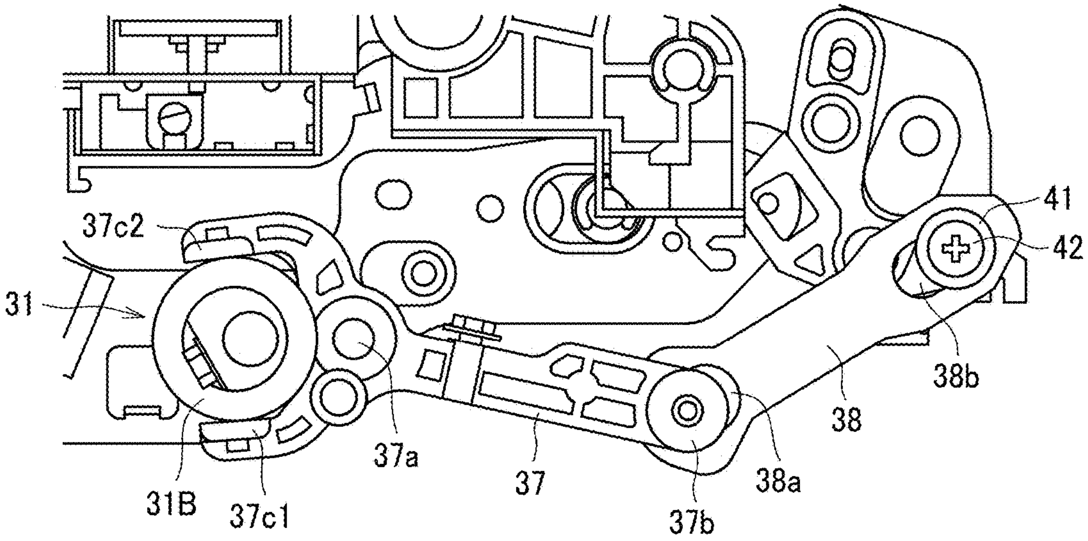
FIG. 23 is a plan view of a configuration around a first arm and a second arm, according to an embodiment of the present disclosure.

As illustrated in FIGS. 21 and 23, a first arm 37 holds the second cam 31B at two positions at which handle 37*c*1 and a handle 37*c*2 are disposed. The rotation of the second cam 31B causes the first arm 37 to rotate about the rotation fulcrum 37*a*. The front slider 32 is moved from the position of the front slider 32 in FIG. 13 to the position of the front slider 32 in FIG. 22. Accordingly, the first arm 37 rotates clockwise in FIG. 23 about the rotation fulcrum 37*a*.

As illustrated in FIG. 21, a thrust stopper 60 that serves as a restrictor and a slip-off stopper is attached to the first arm 37. The thrust stopper 60*b* restricts the position of the outer peripheral surface of the second cam 31B. Accordingly, a direction in which the first arm 37 moves relative to the second cam 31B can be restricted. In other words, the first arm 37 can be restricted from moving in a direction along the outer peripheral surface of the second cam 31B, for example, in a direction in which the first arm 37 slides toward the second cam 31B.

Figure 24:
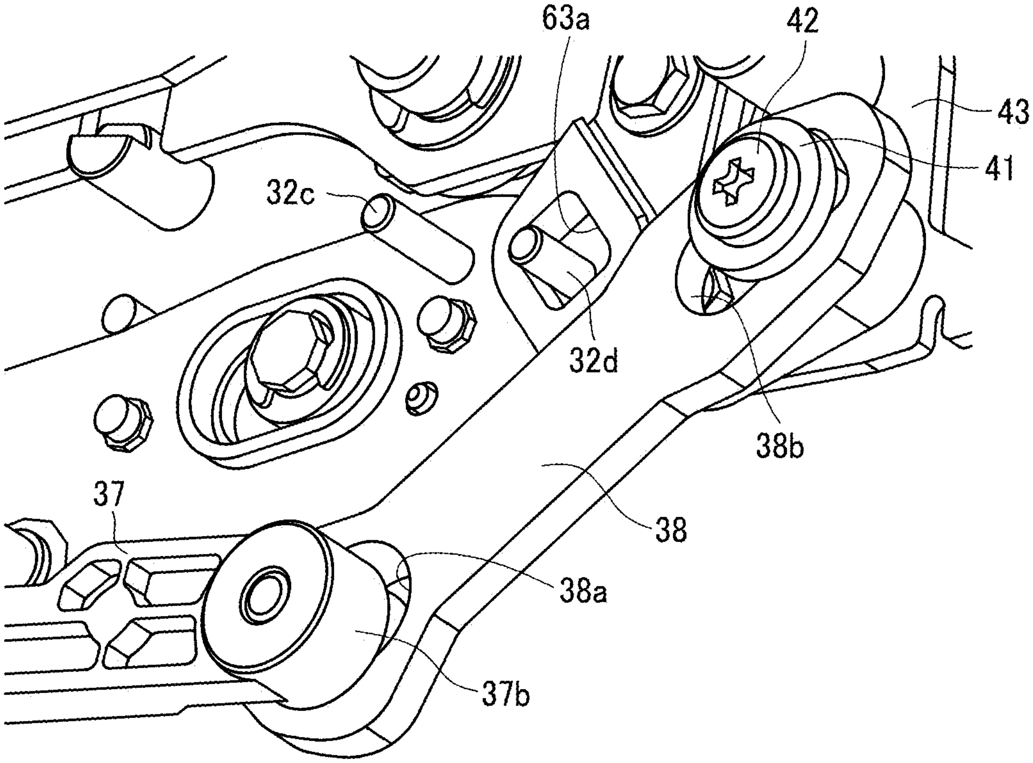
FIG. 24 is a perspective view of the first arm and the second arm of FIG. 23 and components around the first arm and the second arm, according to an embodiment of the present disclosure.
Figure 25:
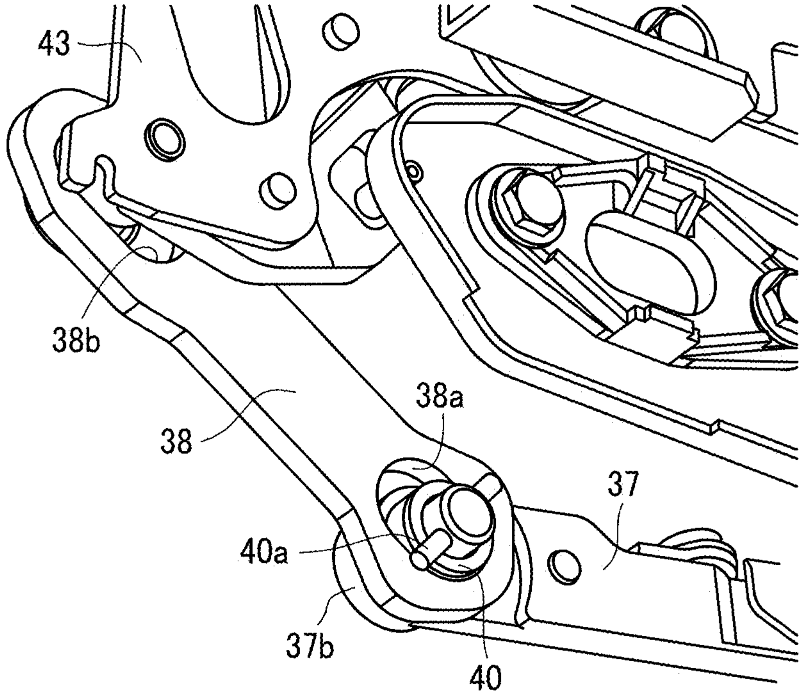
FIG. 25 is a perspective view of the first arm and the second arm of FIG. 23 and components around the first arm and the second arm viewed from the back side of FIG. 24, according to an embodiment of the present disclosure.

FIG. 24 is a perspective view of the first arm 37, a second arm 38, and components around the first arm 37 and the second arm 38 viewed from the front side of the image forming apparatus 1, according to the present embodiment. FIG. 25 is a perspective view of the first arm 37, the second arm 38, and components around the first arm 37 and the second arm 38 viewed from the rear side of the image forming apparatus 1, according to the present embodiment.

As illustrated in FIG. 24, the second arm 38 that serves as the second link member includes an elongated hole 38*a* and an elongated hole 38*b* at both ends of the second arm 38. An end 37*b* of the first arm 37 inserts into the elongated hole 38*a* of the second arm 38. As illustrated in FIG. 25, the end 37*b* of the first arm 37 includes a bearing 40. The bearing 40 is disposed to be movable in the elongated hole 38*a* in a longitudinal direction of the elongated hole 38*a*. The bearing 40 serves as an insertion portion to insert into the elongated hole 38*a*.

As illustrated in FIG. 24, a bearing 41 inserts into the elongated hole 38*b*. The bearing 41 is fixed to a first sensor bracket 43 as a holder by a step screw 42. The bearing 41 is movable in the elongated hole 38*b*. The bearing 41 serves as an insertion portion to insert into the elongated hole 38*b*.

Rotation of the cam 31 causes the front slider 32 to move from the position of the front slider 32 in FIG. 13 to the right side of FIG. 13 to move the primary transfer roller 7T of the most-downstream primary transfer section 203 to the separation position. By so doing, the second cam 31B rotates to cause the first arm 37 to rotate clockwise about the rotation fulcrum 37*a*. Accordingly, the end 37*b* of the first arm 37 moves downward in FIG. 13. Accordingly, as illustrated in FIG. 22, the end 37*b* moves to an end of the elongated hole 38*a* in the longitudinal direction and contacts a wall surface forming the elongated hole 38*a* to pull the second arm 38 in a lower left direction in FIG. 22. Accordingly, the bearing 41 moves to an end of the elongated hole 38*b* in the longitudinal direction and contacts a wall surface forming the elongated hole 38*b*. Then, the second arm 38 pulls the first sensor bracket 43 in the lower left direction in FIG. 22.

Figure 26:
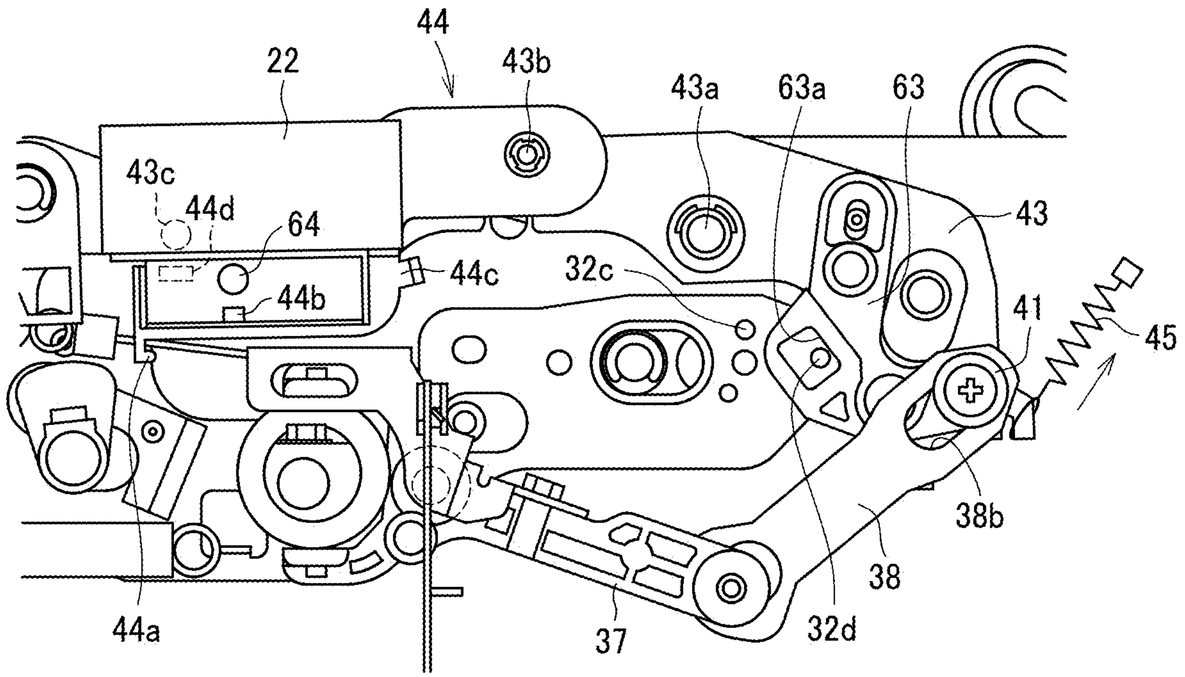
FIG. 26 is a diagram illustrating a configuration around a first sensor bracket and a sensor, according to an embodiment of the present disclosure.

FIG. 26 is a diagram illustrating a configuration around the first sensor bracket 43 and the sensor 22 and is a diagram illustrating a configuration in which the rotator 21 is removed from, for example, FIG. 13, according to the present embodiment. In FIG. 26, the sensor 22 and a second sensor bracket 44 are illustrated in a simplified manner for the sake of convenience.

As illustrated in FIG. 26, the first sensor bracket 43 is rotatable about the rotation fulcrum 43*a*. The first sensor bracket 43 receives a force from the spring 45, which is fixed to the housing of the image forming apparatus 1, in a direction in which the first sensor bracket 43 rotates counterclockwise in FIG. 26 about the rotation fulcrum 43*a*. A restriction bracket 63 is fixed to the first sensor bracket 43. A pin 32*d* of the front slider 32 is inserted in a hole 63*a* of the restriction bracket 63. When the primary transfer roller 7T of the most-downstream primary transfer section 203 is arranged at the contact position in FIG. 13, the pin 32*d* contacts a wall surface forming walls of the hole 63*a*. By so doing, the front slider 32 applies a force to the first sensor bracket 43 such that the first sensor bracket 43 rotates clockwise about the rotation fulcrum 43*a* in FIG. 26.

The second sensor bracket 44 is fixed to the first sensor bracket 43 via a stud 43*b* disposed on the first sensor bracket 43. The second sensor bracket 44 holds the sensor 22. The second sensor bracket 44 includes a hook 44*a* to which one end of a spring 62 (see FIG. 13) is attached, a first contact portion 44*b*, and a second contact portion 44*c*.

When the primary transfer roller 7T of the most-downstream primary transfer section 203 is arranged at the contact position in FIG. 13, the second sensor bracket 44 is biased by the spring 62 to move in a direction in which the second sensor bracket 44 rotates clockwise about the rotation fulcrum 43*a* and is positioned at a position at which the first contact portion 44*b* contacts a stud 64 disposed on the housing of the image forming apparatus 1.

Figure 27:
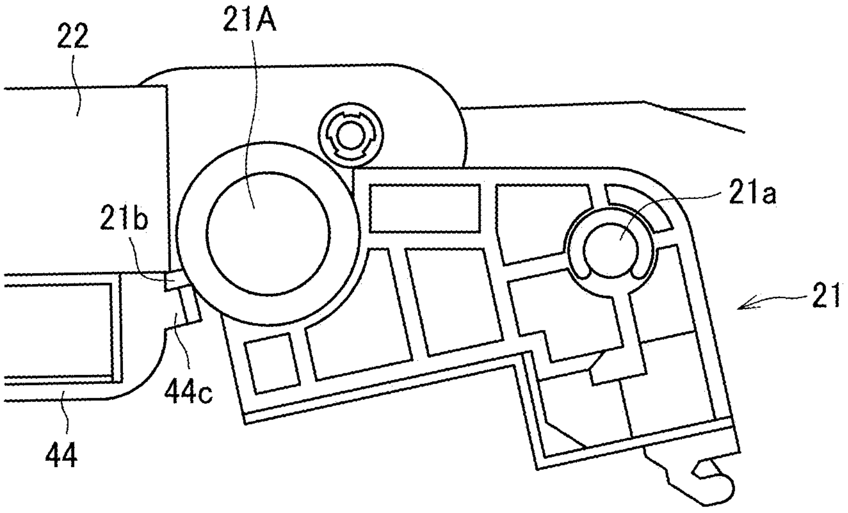
FIG. 27 is a plan view of a second sensor bracket positioned by a positioning portion of a rotator, according to an embodiment of the present disclosure.

When the primary transfer roller 7T of the most-downstream primary transfer section 203 is arranged at the separation position in FIG. 22, the pin 32*d* is moved rightward to release a force of the pin 32*d* pressing the restriction bracket 63 leftward in FIG. 26 as illustrated in FIG. 26. At the same time, the second arm 38 pulls the first sensor bracket 43 in the lower left direction in FIG. 26 as described above to rotate the first sensor bracket 43 clockwise about the rotation fulcrum 43*a* in FIG. 26. Accordingly, the second sensor bracket 44 fixed to the first sensor bracket 43 via the stud 43*b* moves upward in FIG. 26, and the sensor 22 also moves upward in FIG. 26. At this time, as illustrated in FIG. 27, the second sensor bracket 44 is positioned at a position at which the second contact portion 44*c* of the second sensor bracket 44 contacts a positioning portion 21*b* of the rotator 21. In other words, the upward movement of the second sensor bracket 44 and the sensor 22 in, for example, FIG. 26 is restricted, and the sensor 22 is positioned.

As described above, in the present embodiment, the front slider 32 moves in the right direction in FIG. 22 from the position illustrated in FIG. 13 to the position illustrated in FIG. 22. By so doing, the primary transfer roller 7T, the driven roller 21A, the driven roller 33A, and the sensor 22 move in the direction away from the photoconductor 3T. The case in which the front slider 32 is moved in the right direction in FIG. 22 by the driving force of the motor has been described in the above description. However, the front slider 32 may also be moved in the right direction by the operation force applied to the lever portion 71*a*. The above-described movement of the front slider 32 by the operation of the lever portion 71*a* is described below.

The lever portion 71*a* is moved from the restriction position illustrated in FIG. 2 to the release position illustrated in FIG. 3 as described above. By so doing, the lever fixing shaft 71*b* as the rotation fulcrum of the lever portion 71*a* and the cam 80 rotate from the respective positions illustrated in FIG. 13 to the respective positions illustrated in FIG. 14. While the lever fixing shaft 71*b* and the cam 80 rotate as described above, the cam 80 contacts the cam follower 81 attached to the front slider 32 and causes the front slider 32 to move rightward via the cam follower 81 from the position illustrated in FIG. 13 to the position illustrated in FIG. 14. As a result, similar to a case in which the cam 31 is rotated by the motor to cause the primary transfer roller 7T to move from the contact position illustrated in FIG. 13 to the separation position illustrated in FIG. 22, the primary transfer roller 7T, the driven roller 21A, the driven roller 33A, and the sensor 22 can be moved from the respective positions illustrated in FIG. 13 to the respective positions illustrated in FIG. 22 in the direction away from the photoconductor 3T.

As described above, the first moving assembly 91 includes, for example, the front slider 32, the first arm 37, the second arm 38, the first sensor bracket 43, the second sensor bracket 44, the restriction bracket 63, the spring 45, and the spring 62 to move the sensor 22 toward and away from the PCDU 10T or the photoconductor 3T.

As described above, in the present embodiment, as illustrated in FIGS. 2 and 3, operating the lever portion 71*a* causes the restrictor 72T, which restricts the movement of the PCDU 10T in a direction in which the PCDU 10T is detached, to be moved away from the PCDU 10T. By so doing, the PCDU 10T restricted from being detached by the restrictor 72T can be released to be detached. Along with the above-described operation of the lever portion 71*a*, the sensor 22 that interferes with the PCDU 10T when the PCDU 10T is detached from the body of the image forming apparatus 1 can be moved in the direction away from the PCDU 10T. In other words, operating only the lever portion 71*a* allows the PCDU 10T to be detached from the body of the image forming apparatus 1. In addition, interference between PCDU 10T and other components, when the PCDU 10T is detached, can be prevented. Accordingly, the number of procedures when the PCDU 10T is detached from the body of the image forming apparatus 1 can be reduced. As a result, convenience in operations can be enhanced when, for example, the PCDU 10T is detached from the body of the image forming apparatus 1 and maintenance operation of the image forming apparatus 1 is performed. In addition, breakage of the sensor 22 and the PCDU 10T can be prevented even if the operator forgets to move the sensor 22 away from the PCDU 10T when the operation to detach the PCDU 10T is performed.

As in the present embodiment, not only the sensor 22 but also tension members to stretch the intermediate transfer belt 2, such as the primary transfer roller 7T and the driven roller 21A, may be included in a movable component that moves in the direction away from the PCDU 10T or the photoconductor 3T by an operation of the lever portion 71*a*. Such a configuration as described above allows the sensor 22, the primary transfer roller 7T, and the driven roller 21A to be moved away from the PCDU 10T even if the intermediate transfer belt 2 and the primary transfer roller 7T interfere with the PCDU 10T when the PCDU 10T is detached from the body of the image forming apparatus 1. However, all of the sensor 22, the primary transfer roller 7T, and the driven roller 21A may not necessarily need to be moved away from the PCDU 10T by the operation force of the lever portion 71*a* Components that are moved away from the PCDU 10T are not limited to the sensor 22, the primary transfer roller 7T, and the driven roller 21A. Any suitable components disposed in the transfer device 20 can be separated from the PCDU 10T as needed.

In the above description, the configuration in which the primary transfer roller 7T of the most-downstream primary transfer section 203 is separated from the photoconductor 3T in conjunction with the sensor 22 and the restrictor 72T has been described. However, embodiments of the present disclosure are not limited to such a configuration and any other primary transfer roller may be separated from the corresponding one of the photoconductors. Further, the position of the sensor 22 is not limited to the position between the most-downstream primary transfer section 203 and the central primary transfer section 202 as described in the above-described embodiments of the present disclosure.

Next, a second moving assembly 92 as a second mover and a third moving assembly 93 as a third mover are described below with reference to FIG. 28. The second moving assembly 92 moves the primary transfer rollers 7C, 7M and 7Y of the central primary transfer section 202 toward and away from the intermediate transfer belt 2. The third moving assembly 93 moves the primary transfer roller 7K of the most-upstream primary transfer section 201 toward and away from the intermediate transfer belt 2.

Figure 28:
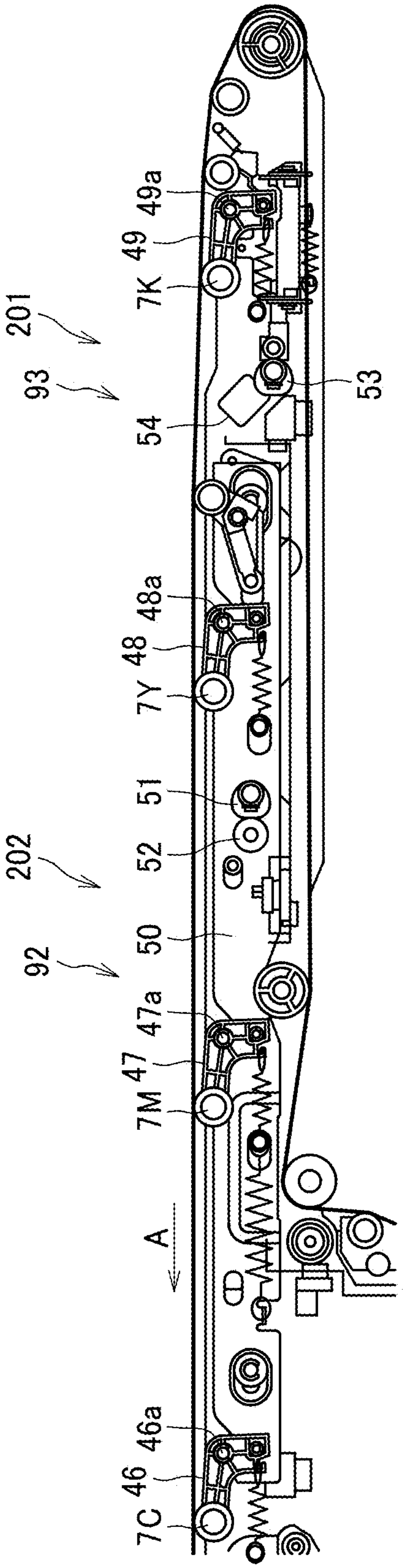
FIG. 28 is a cross-sectional view of a moving assembly to move a central primary transfer section and a most-upstream primary transfer section toward and away from an intermediate transfer belt, according to an embodiment of the present disclosure.

As illustrated in FIG. 28, the second moving assembly 92 includes rotators 46, 47, and 48, a cam 51, and a cam follower 52. The third moving assembly 93 includes a rotator 49, a cam 53, and a cam follower 54. The second moving assembly 92 includes a motor as a driving source to rotate the cam 51, and the third moving assembly 93 includes a motor as a driving source to rotate the cam 53.

The rotators 46, 47, 48, and 49 are rotatable about the rotation fulcrums 46*a*, 47*a*, 48*a*, and 49*a*, respectively. The primary transfer roller 7C is disposed at one end of the rotator 46. The primary transfer roller 7M is disposed at one end of the rotator 47. The primary transfer roller 7Y is disposed at one end of the rotator 48. The primary transfer roller 7K is disposed at one end of the rotator 49. The rotators 46, 47, 48, and 49 are biased by springs to be rotated clockwise in FIG. 28 and cause the primary transfer rollers 7C, 7M, 7Y, and 7K, respectively, to contact the photoconductors 3C, 3M, 3Y, and 3K, respectively, via the intermediate transfer belt 2.

The cam follower 52 rotates by the rotation of the cam 51 to move a front slider 50 of the most-upstream primary transfer section 201 in the right direction in FIG. 28. Accordingly, one end of each of the rotators 46, 47, and 48 opposite to another end at which the corresponding one of the primary transfer rollers 7C, 7M, and 7Y is disposed is pressed. Accordingly, the rotators 46, 47, and 48 rotate counterclockwise in FIG. 28 against the biasing force of the springs. Accordingly, the primary transfer rollers 7C, 7M, and 7Y move away from the photoconductor 3C, 3M, and 3Y, respectively. Further, the rotation of the cam 53 causes the cam follower 54 to rotate, and one end of the rotator 49 opposite to another end of the rotator 49 at which the primary transfer roller 7K is disposed is pressed. Accordingly, the rotator 49 rotates counterclockwise in FIG. 28 against the biasing force of the spring, and the primary transfer roller 7K moves away from the photoconductor 3K. As described above, the primary transfer roller 7K of the most-upstream primary transfer section 201 and the primary transfer rollers 7C, 7M, and 7Y of the central primary transfer section 202 independently move toward and away from the photoconductor 3K, 3C, 3M, and 3Y, respectively.

Embodiments of the present disclosure have been described as above. However, embodiments of the present disclosure are not limited to the embodiments described above, and various modifications and improvements are possible without departing from the gist of the present disclosure.

In the above description, the case in which the operating member is disposed in the transfer device 20 has been described. However, the operating member may be disposed at any position in the image forming apparatus 1 as appropriate, such as on the housing of the image forming apparatus 1.

In the above description, the secondary transfer device 9 that includes the intermediate transfer belt 2 has been described as the transfer device according to embodiments of the present disclosure. However, the transfer device according to embodiments of the present disclosure is not limited to such a configuration. For example, the transfer device may include a conveyance belt to convey a recording medium and forms a transfer nip between the conveyance belt and a photoconductor.

Examples of recording media include not only sheets P (plain sheets of paper) but also thick paper, postcards, envelopes, plain paper, thin paper, coated paper, art paper, tracing paper, overhead projector (OHP) transparencies, plastic film, prepreg, and copper foil.

Aspects of the present disclosure are, for example, as follows.

First Aspect

A transfer device includes a movable component to move toward and away from a latent image bearer unit, a moving assembly to cause the movable component to move toward and away from the latent image bearer unit, a restrictor, and an operating member. The restrictor restricts the latent image bearer unit from detaching from an image forming apparatus. Operating the operating member causes the moving assembly to move the component away from the latent image bearer unit and releases restriction of detachment of the latent image bearer unit from the image forming apparatus by the restrictor.

Second Aspect

In the transfer device according to the first aspect, the operating member includes an operating portion operable in a first direction and a second direction opposite to the first direction. The transfer device further includes a fixing mechanism to fix the operating portion at a predetermined fixed position in the first direction and a biasing member to bias the operating portion in the second direction.

Third Aspect

The transfer device according to the first or second aspect further includes a rotation shaft to rotate by an operation force of the operating member, and a link to receive a rotation force of the rotation shaft to move. The restrictor is attached to the link.

Fourth Aspect

In the transfer device according to the third aspect, the restrictor includes an elastically deformable portion attached to the link.

Fifth Aspect

In the transfer device according to the fourth aspect, the elastically deformable portion is a plate spring.

Sixth Aspect

In the transfer device according to the fourth aspect, the elastically deformable portion is a plate having a thickness of 0.5 mm or less.

Seventh Aspect

In the transfer device according to any one of the fourth to sixth aspects, the elastically deformable portion has an insertion hole. The link includes an insertion portion to insert into the insertion hole. The insertion portion includes a slip-off stopper pin to prevent the insertion portion from disengaging from the insertion hole.

Eighth Aspect

In the transfer device according to the seventh aspect, the slip-off stopper pin extends in one radial direction of the insertion portion.

Ninth Aspect

The transfer device according to the second aspect or any one of the third to eighth aspects according to the second aspect further includes a transfer frame having a first portion. The first portion is disposed downstream from the operating portion in the first direction. The fixed position is upstream from the first portion in the first direction in the operating portion.

Tenth Aspect

An image forming apparatus includes the latent image bearer unit and the transfer device according to any one of the first to ninth aspects.

Eleventh Aspect

The image forming apparatus includes a latent image bearer unit including a latent image bearer, the transfer device including the movable component to move toward and away from the latent image bearer unit, a moving assembly to move the movable component toward and away from the latent image bearer unit, a restrictor, and an operating member. The latent image bearer unit is attachable to and detachable from a body of the image forming apparatus. The restrictor restricts the latent image bearer unit from detaching from the body of the image forming apparatus. Operating the operating member causes the moving assembly to move the movable component toward and away from the latent image bearer unit and releases restriction of the latent image bearer unit from detaching from the image forming apparatus by the restrictor.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:

a first assembly;

a restrictor to restrict the first assembly from detaching from the image forming apparatus; and a second assembly including:

an operating structure to release restriction of detachment of the first assembly from the image forming apparatus by the restrictor;

a rotation shaft to rotate by an operation force of the operating structure; and a link to receive a rotation force of the rotation shaft to move, wherein the restrictor includes an elastically deformable portion attached to the link, wherein the elastically deformable portion has an insertion hole, wherein the link includes an insertion portion to insert into the insertion hole, and wherein the insertion portion includes a slip-off stopper pin to prevent the insertion portion from disengaging from the insertion hole.

2. The image forming apparatus according to claim 1, further comprising:

a fixing structure to fix an operating portion of the operating structure at a predetermined fixed position in a first direction; and a biasing structure to bias the operating portion in a second direction opposite the first direction, wherein the operating portion is operable in the first direction and the second direction.

3. The image forming apparatus according to claim 1, wherein the elastically deformable portion is a plate spring.

4. The image forming apparatus according to claim 1, wherein the elastically deformable portion is a plate having a thickness of 0.5 mm or less.

5. The image forming apparatus according to claim 1, wherein the slip-off stopper pin extends in one radial direction of the insertion portion.

6. The image forming apparatus according to claim 2, further comprising a transfer frame having a portion downstream from the operating portion in the first direction, wherein the fixed position is upstream from the portion in the first direction in the operating portion.

7. The image forming apparatus according to claim 1, wherein the operating structure is a lever.

8. The image forming apparatus according to claim 1, wherein the first assembly includes a latent image bearer.

* * * * *